United States Patent
Cole et al.

(10) Patent No.: US 8,945,739 B2
(45) Date of Patent: *Feb. 3, 2015

(54) FLUIDIC ARCHITECTURE FOR METAL-HALOGEN FLOW BATTERY

(71) Applicant: Primus Power Corporation, Hayward, CA (US)

(72) Inventors: Russell Cole, San Francisco, CA (US); Rick Winter, Orinda, CA (US); Jonathan Hall, San Mateo, CA (US); Pallavi Pharkya, Fremont, CA (US); Gerardo Jose la O', Alameda, CA (US); Lauren W. Hart, San Francisco, CA (US); Paul Kreiner, San Francisco, CA (US); Peter Tennessen, Hayward, CA (US)

(73) Assignee: Primus Power Corporation, Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/230,813

(22) Filed: Mar. 31, 2014

(65) Prior Publication Data
US 2014/0308547 A1    Oct. 16, 2014

Related U.S. Application Data

(63) Continuation-in-part of application No. PCT/US2013/031952, filed on Mar. 15, 2013, which is a continuation of application No. 13/630,572, filed on Sep. 28, 2012.

(60) Provisional application No. 61/621,257, filed on Apr. 6, 2012.

(51) Int. Cl.
*H01M 8/18* (2006.01)
*H01M 8/20* (2006.01)

(52) U.S. Cl.
CPC .............. *H01M 8/186* (2013.01); *H01M 8/188* (2013.01); *H01M 8/20* (2013.01); *H01M 8/18* (2013.01); *H01M 8/184* (2013.01)
USPC ................ 429/51; 429/72; 429/101; 429/105

(58) Field of Classification Search
None
See application file for complete search history.

(56) References Cited

U.S. PATENT DOCUMENTS

| 3,644,190 A | 2/1972 | Weist et al. |
| 3,713,888 A | 1/1973 | Symons |

(Continued)

FOREIGN PATENT DOCUMENTS

| JP | 63-314782 A | 12/1988 |
| JP | 02-010671 A | 1/1990 |

(Continued)

OTHER PUBLICATIONS

Symons, Philip C., "Advanced Technology Zinc/Chlorine Batteries for Electric Utility Load Leveling," 19th Intersociety Energy Conversion Engineering Conf., 1984, vol. 2, 857-862.

(Continued)

*Primary Examiner* — Milton I Cano
*Assistant Examiner* — Wojciech Haske
(74) *Attorney, Agent, or Firm* — The Marbury Law Group PLLC

(57) ABSTRACT

A metal-halogen flow battery system includes a stack of flow cells, an electrolyte reservoir and one or more of a concentrated halogen return line fluidly connecting the stack to the reservoir, a venturi, a mixer, a concentrated halogen pump, or a concentrated halogen line heater.

19 Claims, 21 Drawing Sheets

(56) References Cited

U.S. PATENT DOCUMENTS

| | | |
|---|---|---|
| 3,773,561 A | 11/1973 | Bjorkman |
| 3,813,301 A | 5/1974 | Carr |
| 3,909,298 A | 9/1975 | Carr |
| 3,935,024 A | 1/1976 | Symons |
| 3,940,283 A | 2/1976 | Symons |
| 3,954,502 A | 5/1976 | Symons et al. |
| 3,993,502 A | 11/1976 | Bjorkman, Jr. |
| 4,001,036 A | 1/1977 | Berman et al. |
| 4,020,238 A | 4/1977 | Symons |
| 4,025,697 A | 5/1977 | Hart |
| 4,068,043 A | 1/1978 | Carr |
| 4,071,660 A | 1/1978 | Hart |
| 4,072,540 A | 2/1978 | Symons et al. |
| 4,086,393 A | 4/1978 | Hart |
| 4,100,332 A | 7/1978 | Carr |
| 4,115,529 A | 9/1978 | Behling |
| 4,127,701 A | 11/1978 | Symons et al. |
| 4,146,680 A | 3/1979 | Carr et al. |
| 4,162,351 A | 7/1979 | Putt et al. |
| 4,200,684 A | 4/1980 | Bro |
| 4,257,867 A | 3/1981 | Hammond et al. |
| 4,273,839 A | 6/1981 | Carr et al. |
| 4,287,267 A | 9/1981 | Whittlesey et al. |
| 4,306,003 A | 12/1981 | Henriksen |
| 4,307,159 A | 12/1981 | Hammond et al. |
| 4,320,179 A | 3/1982 | Hart |
| 4,371,825 A | 2/1983 | Chi et al. |
| 4,413,042 A | 11/1983 | Carr |
| 4,414,292 A | 11/1983 | Kiwalle et al. |
| 4,415,847 A | 11/1983 | Galloway |
| 4,482,614 A | 11/1984 | Zito, Jr. |
| 4,518,663 A | 5/1985 | Kodali et al. |
| 4,518,664 A | 5/1985 | Whittlesey et al. |
| 4,521,497 A | 6/1985 | Tamminen |
| 4,534,833 A | 8/1985 | Carr et al. |
| 4,567,120 A | 1/1986 | Jorne et al. |
| 4,678,656 A | 7/1987 | Bjorkman, Jr. et al. |
| 4,728,587 A | 3/1988 | Horie et al. |
| 4,746,585 A | 5/1988 | Stoner et al. |
| 4,766,045 A | 8/1988 | Bellows et al. |
| 5,695,889 A | 12/1997 | Harbauer et al. |
| 8,450,001 B2 | 5/2013 | Kell et al. |
| 2004/0169493 A1 | 9/2004 | Tsutsui et al. |
| 2004/0234843 A1 | 11/2004 | Skyllas-Kazacos |
| 2005/0181273 A1 | 8/2005 | Deguchi et al. |
| 2005/0244707 A1 | 11/2005 | Skyllas-Kazacos |
| 2009/0239131 A1 | 9/2009 | Winter |
| 2010/0021805 A1 | 1/2010 | Winter |
| 2010/0323264 A1 | 12/2010 | Chiang et al. |
| 2011/0070468 A9 | 3/2011 | Winter |
| 2011/0223451 A1 | 9/2011 | Winter et al. |
| 2012/0052340 A1 | 3/2012 | La O' et al. |
| 2012/0328910 A1 | 12/2012 | La O' et al. |
| 2013/0266829 A1 | 10/2013 | Cole et al. |
| 2014/0093804 A1 | 4/2014 | Kreiner et al. |

FOREIGN PATENT DOCUMENTS

| | | | |
|---|---|---|---|
| JP | 07-065871 A | 3/1995 | |
| JP | 07-153478 A | 6/1995 | |
| JP | 2001-216995 A | 8/2001 | |
| WO | WO 2008/089205 A2 | 7/2008 | |
| WO | WO 2008089205 A2 * | 7/2008 | ............ H01M 4/96 |
| WO | WO 2011/011533 A2 | 1/2011 | |

OTHER PUBLICATIONS

EPRI Report, EM-1051 (parts 1-3), Apr. 1979, Electric Power Research Institute.

International Preliminary Report on Patentability received in connection with international application No. PCT/US2012/043805; mailed Jan. 16, 2014.

International Search Report & Written Opinion issued in PCT Application No. PCT/US2012/043805, mailed on Jan. 23, 2013.

International Search Report received in connection with international application No. PCT/US2013/031952; mailed Jun. 28, 2013.

* cited by examiner

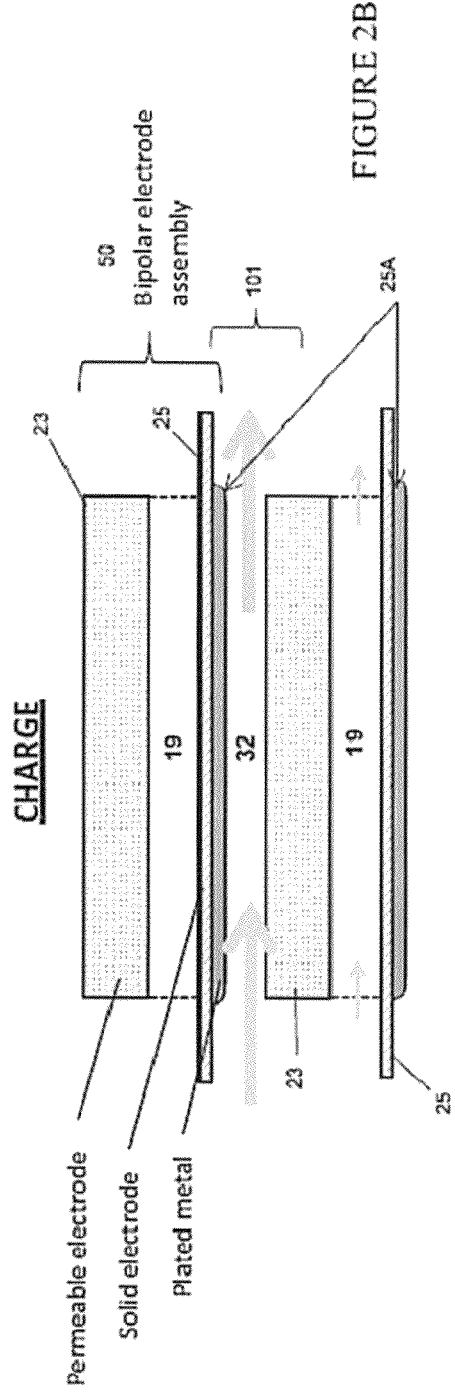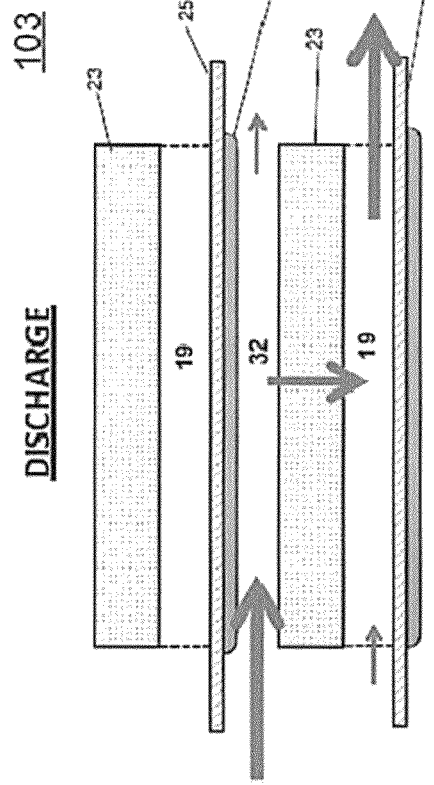

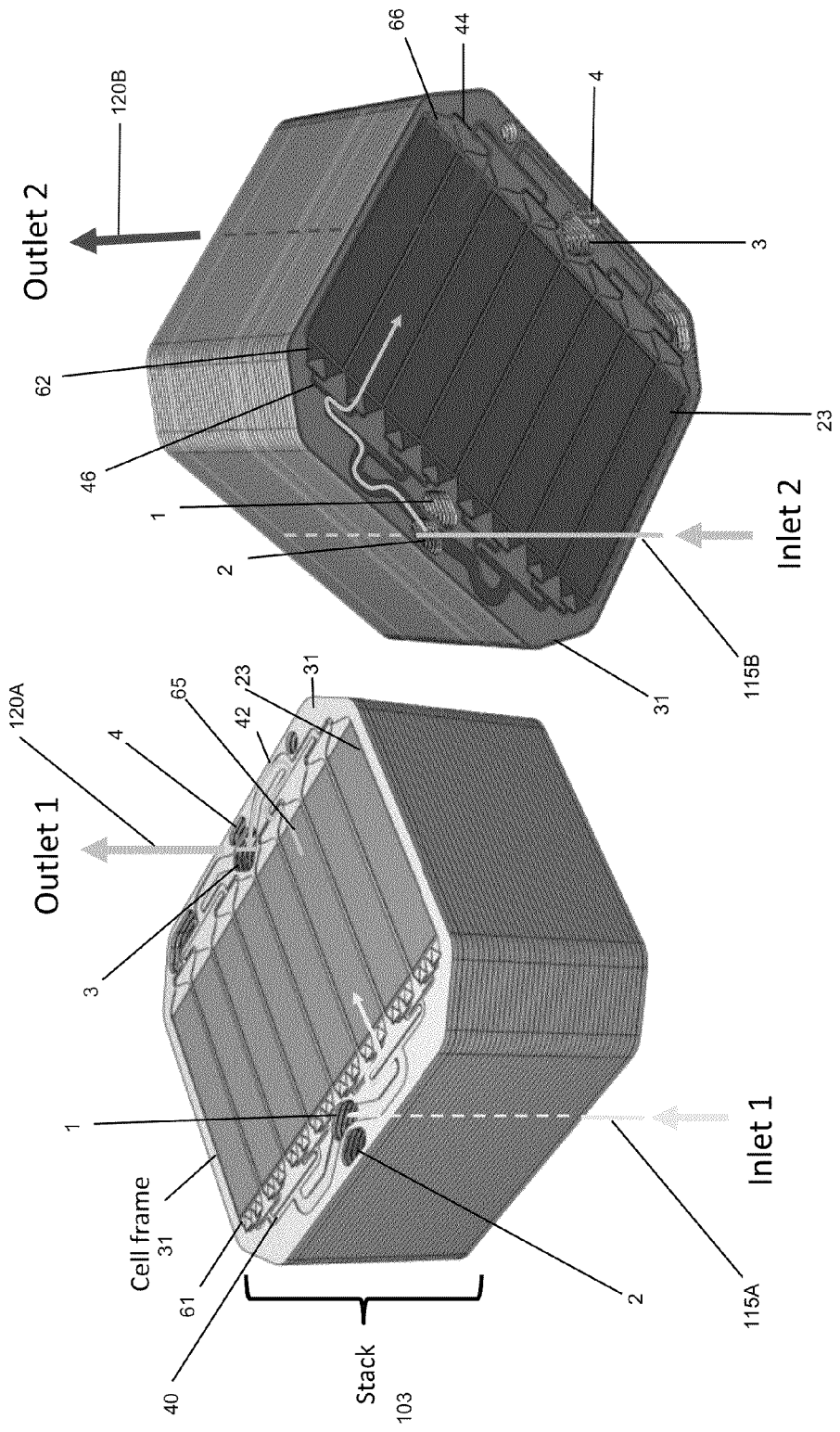

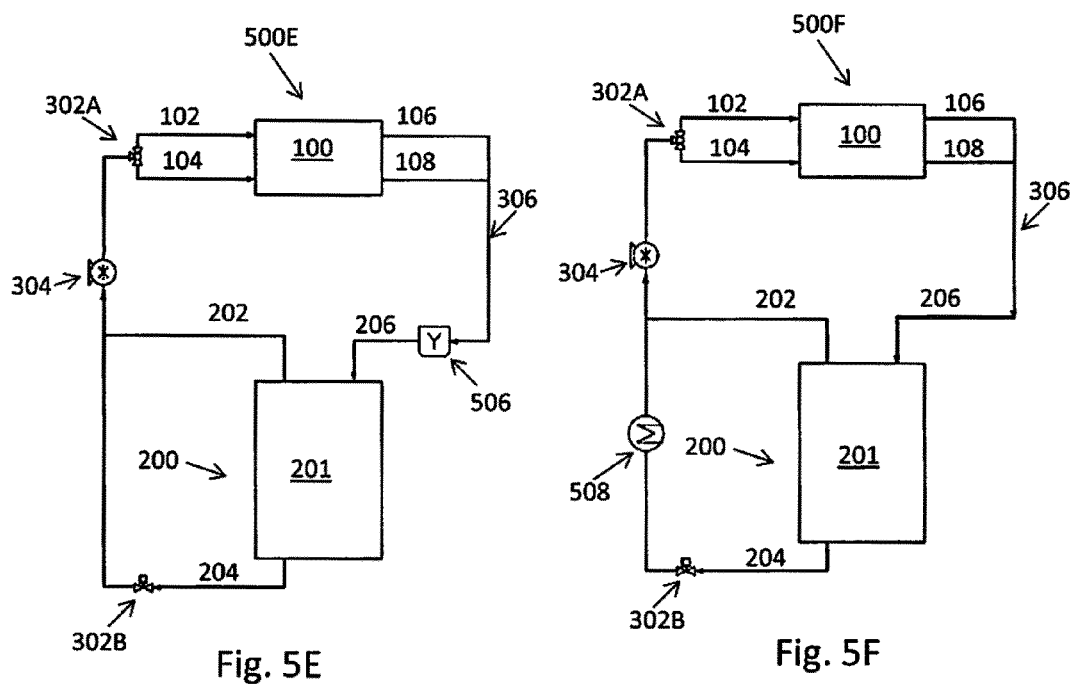

FLUIDIC ARCHITECTURE FOR METAL-HALOGEN FLOW BATTERY

CROSS-REFERENCE TO RELATED PATENT APPLICATIONS

The present application is a continuation-in-part of PCT application number PCT/US2013/031952 titled "Fluidic Architecture for Metal-Halogen Flow Battery" filed Mar. 15, 2013, which claims the benefit of U.S. patent application Ser. No. 13/630,572 entitled "Fluidic Architecture for Metal-Halogen Flow Battery" filed Sep. 28, 2012, which claims the benefit of priority to U.S. Provisional Patent Application No. 61/621,257, entitled "Fluidic Architecture for Metal-Halogen Flow Battery" filed on Apr. 6, 2012. The entire contents of all three applications are incorporated herein by reference.

FIELD

The present invention is directed to electrochemical systems and methods of using same.

BACKGROUND

The development of renewable energy sources has revitalized the need for large-scale batteries for off-peak energy storage. The requirements for such an application differ from those of other types of rechargeable batteries such as lead-acid batteries. Batteries for off-peak energy storage in the power grid generally are required to be of low capital cost, long cycle life, high efficiency, and low maintenance.

One type of electrochemical energy system suitable for such an energy storage is a so-called "flow battery" which uses a halogen component for reduction at a normally positive electrode in discharge mode, and an oxidizable metal adapted to become oxidized at a normally negative electrode during the normal operation of the electrochemical system. An aqueous metal halide electrolyte is used to replenish the supply of halogen component as it becomes reduced at the positive electrode. The electrolyte is circulated between the electrode area and a reservoir area. One example of such a system uses zinc as the metal and chlorine as the halogen.

Such electrochemical energy systems are described in, for example, U.S. Pat. Nos. 3,713,888, 3,993,502, 4,001,036, 4,072,540, 4,146,680, and 4,414,292, and in EPRI Report EM-1051 (Parts 1-3) dated April 1979, published by the Electric Power Research Institute, the disclosures of which are hereby incorporated by reference in their entirety.

SUMMARY

An embodiment relates to metal-halogen flow battery system includes a stack of flow cells, an electrolyte reservoir and one or more of a concentrated halogen return line fluidly connecting the stack to the reservoir, a venturi, a mixer, a concentrated halogen pump, or a concentrated halogen line heater.

Another embodiment relates to a method of using the flow battery system described above.

Another embodiment relates to a method of separating the stack outlet stream into a concentrated halogen from the aqueous metal halide electrolyte outside of the stack and providing the concentrated halogen into a lower portion of the reservoir via a concentrated halogen return line.

Another embodiment relates to a method of operating a flow battery comprising a stack of flow cells in which each flow cell in the stack includes a fluid permeable electrode, a fluid impermeable electrode, and a reaction zone between the permeable and impermeable electrodes. The method includes the following steps.

(a) In charge mode, plating a metal layer on the impermeable electrode of each cell in the reaction zone by: (i) flowing a metal halide electrolyte from a reservoir through an inlet conduit to the reaction zone of each flow cell in the stack in a first direction, such that a majority of the metal halide electrolyte enters the reaction zone from the inlet conduit without first flowing through the permeable electrode in the flow cell or through a flow channel located between adjacent flow cell electrodes in the stack; and (ii) flowing the metal halide electrolyte from the reaction zone of each flow cell in the stack through a first outlet conduit to the reservoir, such that the majority of the metal halide electrolyte does not pass through the permeable electrode in each flow cell before reaching the first outlet conduit; and (b) In discharge mode, de-plating the metal layer on the impermeable electrode of each cell in the reaction zone by: (i) flowing a mixture of the metal halide electrolyte and a concentrated halogen reactant from the reservoir through the inlet conduit to the reaction zone of each flow cell in the stack in the first direction, such that a majority of the mixture enters the reaction zone from the inlet conduit without first flowing through the permeable electrode in the flow cells or through the flow channel located between adjacent flow cell electrodes in the stack; and (ii) flowing the mixture from the reaction zone of each flow cell in the stack through a second outlet conduit to the reservoir, such that a majority of the mixture passes through the permeable electrode in each flow cell before reaching the second outlet conduit.

BRIEF DESCRIPTION OF THE DRAWINGS

FIGS. 2B and 2C illustrate schematic side cross sectional views of flow paths in the flow battery cells of the system of FIG. 2A.

FIGS. 3C and 3D are respective three dimensional top and bottom views illustrating details of the stack of flow battery cells of the embodiment system of FIG. 2A.

FIG. 5E is a schematic illustration of a balance of plant plumbing configuration of a system according to an embodiment in which a mixing is placed on the joined exits of the battery cell stack.

FIG. 5F is a schematic illustration of a balance of plant plumbing configuration of a system according to an embodiment in which an inline heater element is located on the concentrated halogen injection line.

DETAILED DESCRIPTION

Figure 1:
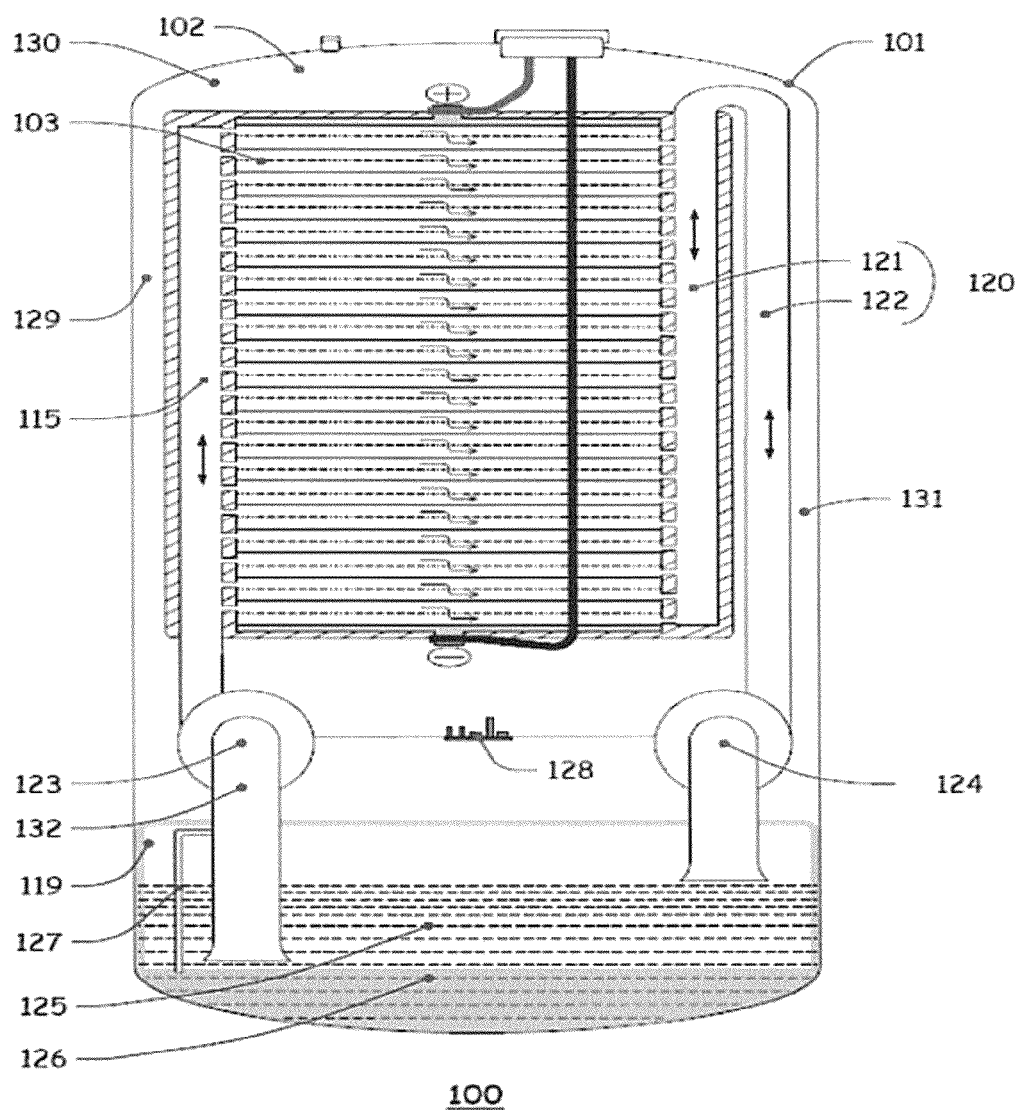
FIG. 1 illustrates a side cross sectional view of an embodiment of the electrochemical system with a sealed container containing a stack of electrochemical cells.

Embodiments of the present invention are drawn to metal-halogen flow battery systems and methods of using these systems. The systems include flow architecture with a single flow circuit. Conventional metal halogen flow batteries maintain electrochemical efficiency by keeping reactant streams contained in two distinct flow loops by using a separator between the positive and negative electrodes of each flow cell and separate reservoirs for the electrolyte and the halogen reactant. The configurations below describe systems and methods for reactant handling that combine the simplicity and reliability of a single flow loop system with reactant separation balance of plant (BOP) components. Preferably, the single flow loop system includes a stack of flow battery cells without a separator between the positive and negative electrodes of each flow cell (i.e., the reaction zone is not partitioned) and a common reservoir for the electrolyte and the concentrated halogen reactant.

The electrochemical (e.g., flow battery) system can include a vessel containing one or more electrochemical cells (e.g., a stack of flow battery cells) in its inner volume, a metal-halide electrolyte, and a flow circuit configured to deliver the metal-halide electrolyte to the electrochemical cell(s). The flow circuit may be a closed loop circuit that is configured to deliver the electrolyte to and from the cell(s). In many embodiments, the loop circuit may be a sealed loop circuit.

Each of the electrochemical cell(s) may comprise a first, fluid permeable electrode, which may serve as a positive electrode, a second, fluid impermeable electrode, which may serve as a negative electrode, and a reaction zone between the electrodes. The first electrode may be a porous electrode or contain at least one porous element. The first electrode may comprise a porous or a permeable carbon, metal or metal oxide electrode. For example, the first electrode may comprise porous carbon foam, a metal mesh or a porous mixed metal oxide coated electrode, such as a porous titanium electrode coated with ruthenium oxide (i.e., ruthenized titanium). In discharge and charge modes, the first electrode may serve as a positive electrode at which the halogen may be reduced into halogen ions. The second electrode may comprise a primary depositable and oxidizable metal, i.e., a metal that may be oxidized to form cations during the discharge mode. For example, the second electrode may comprise a metal that is of the same type as a metal ion in one of the components of the metal halide electrolyte. For example, when the metal halide electrolyte comprises zinc halide, such as zinc chloride or zinc bromide, the second electrode may comprise metallic zinc. Alternatively, the second electrode may comprise another material, such as titanium that is plated with zinc.

Preferably, the reaction zone lacks a separator and the electrolyte circulates through the same flow path (e.g., single loop) without a separation between the electrodes in each cell. In other words, the reaction zone may be such that it does not contain a membrane or a separator between the positive and negative electrodes of the same cell that is impermeable to the halogen ions in the electrolyte. Furthermore, the cell may be a hybrid flow battery cell rather than a redox flow battery cell. Thus, in the hybrid flow battery cell, a metal, such as zinc is plated onto one of the electrodes, the reaction zone lacks an ion exchange membrane which allows ions to pass through it (i.e., there is no ion exchange membrane between the cathode and anode electrodes) and the electrolyte is not separated into a catholyte and anolyte by the ion exchange membrane. The electrolyte is stored in one reservoir rather than in separate catholyte and anolyte reservoirs.

Preferably, the electrochemical system may be reversible, i.e., capable of working in both charge and discharge operation mode. The reversible electrochemical system usually utilizes at least one metal halide in the electrolyte, such that the metal of the metal halide is sufficiently strong and stable in its reduced form to be able to form an electrode. The metal halides that can be used in the reversible system include zinc halides, as element zinc is sufficiently stable to be able to form an electrode. Preferably, the electrolyte is aqueous solution of at least one metal halide electrolyte compound, such as $ZnBr_2$ and/or $ZnCl_2$. For example, the solution may be a 15-50% aqueous solution of $ZnBr_2$ and/or $ZnCl_2$, such as a 25% solution. In certain embodiments, the electrolyte may contain one or more additives, which can enhance the electrical conductivity of the electrolytic solution. For example, when the electrolyte contains $ZnCl_2$, such additive can be one or more salts of sodium or potassium, such as NaCl or KCl. When the electrolyte contains $ZnBr_2$, then the electrolyte may also contain a bromine complexing agent, such as such as a quaternary ammonium bromide (QBr), such as N-ethyl-N-methyl-morpholinium bromide (MEM), N-ethyl-N-methyl-pyrrolidinium bromide (MEP) or Tetra-butyl ammonium bromide (TBA)).

FIG. 1 illustrates an electrochemical system 100 which includes a stack of flow battery cells in a sealed container 102. The flow battery cells inside the sealed container 102 are preferably a horizontally positioned cell, which may include a horizontal positive electrode and horizontal negative electrode separated by a gap. For example, element 103 in FIG. 1 represents a vertical stack of horizontally positioned electrochemical cells (i.e., flow cells) connected electrically in series.

As shown in FIG. 1 a feed (e.g., inlet) conduit (e.g., pipe or manifold 115) is configured to deliver the metal-halide electrolyte to the horizontally positioned cells of the stack 103. A return (e.g., outlet) conduit (e.g., pipe or manifold) 120 is configured to collect products of an electrochemical reaction from cells of the stack. The return pipe or manifold 120 may be an upward-flowing return pipe or manifold. The pipe or manifold 120 includes an upward running section 121 and a downward running section 122. The flow of the metal-halide electrolyte and the concentrated halogen reactant leaves the cells of the stack 103 upward through the section 121 and then goes downward to the reservoir through the section 122. As will be discussed in more detail below, in some embodiments, the feed pipe or manifold and/or the return pipe or manifold may be a part of a stack assembly for the stack of the horizontally positioned cells. In some embodiments, the stack 103 may be supported directly by walls of the vessel 102. Yet in some embodiments, the stack 103 may be supported by one or more pipes, pillars or strings connected to walls of the vessel 102 and/or reservoir 119.

The flow battery system may include one or more pumps for pumping the metal-halide electrolyte. Such a pump may or may not be located within the inner volume of the sealed vessel. For example, FIG. 1 shows discharge pump 123, which fluidly connects the reservoir 119 and the feed pipe or manifold 115. The pump 123 is configured to deliver the metal-halide electrolyte through the feed pipe or manifold 115 to the stack of flow battery cell(s) 103. In some embodiments, the flow battery system may include an optional additional pump 124. The pump 124 fluidly connects the return pipe or manifold 120 to the reservoir 119 and can be used to deliver the metal-halide electrolyte through the return pipe or manifold to the stack of cell(s) in charge and/or discharge mode. Alternatively, pump 124 may be omitted and the system may comprise a single flow loop/single pump flow battery system. Any suitable pumps may be used in the system, such as centripetal and/or centrifugal pumps.

The reservoir 119 may contain a feed line 127 for the concentrated halogen reactant, which may supply the halogen reactant to the feed pipe or manifold 115 of the system. As used herein, a "concentrated halogen reactant" includes aqueous electrolyte with higher than stoichiometric halogen content (e.g., higher halogen content than 1:2 zinc to halogen ratio for zinc-halide electrolyte), pure liquid halogen (e.g., liquid chlorine and/or bromine) or chemically-complexed halogen, such as a bromine-MEP or another bromine-organic molecule complex. A connection between the halogen reactant feed line 127 and the feed pipe manifold 115 may occur before, at or after the pump 123. An inlet of the feed line 127 is located in the lower part 126 of the reservoir 119, where the complexed bromine reactant may be stored. An outlet of the feed line 127 is connected to an inlet of the pump 123. The electrolyte intake feed line, such as a pipe or conduit 132, is located in the upper part 125 of the reservoir 119, where the lighter metal-halide electrolyte (e.g., aqueous zinc bromide) is located.

In some embodiments, the electrochemical system may include a controlling element, which may be used, for example, for controlling a rate of the pump(s). Such a controlling element may be an analog circuit. FIG. 1 depicts the controlling element as element 128.

Flow Configurations

Figure 2A:
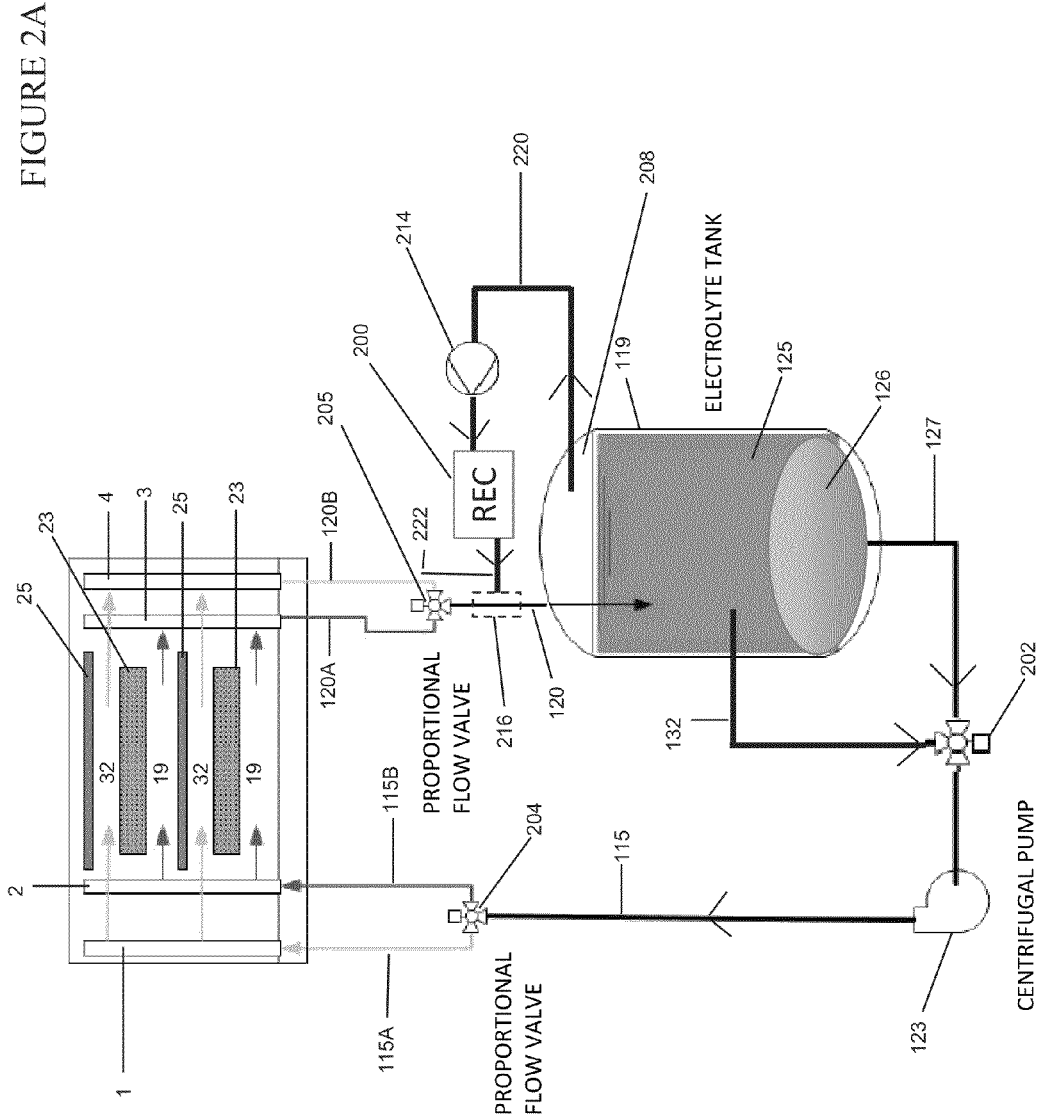
FIG. 2A illustrates a schematic side cross sectional view of flow paths in the embodiment electrochemical system.

FIGS. 2B and 2C schematically illustrate respective charge mode and discharge mode paths for a flow of the metal-halide electrolyte and the halogen reactant through the horizontally positioned cells of the stack, such as the stack 103 of FIGS. 1 and 2A. The electrolyte flow paths in FIGS. 2A-2C are represented by arrows. The reservoir 119 may contain one or more internal liquid portions as well as one or more internal gaseous portions. In this embodiment, the reservoir 119 includes two liquid portions 125 and 126, and one gaseous portion 208. Gaseous species, such as halogen (e.g. $Cl_2$ or $Br_2$) and hydrogen gas, are stored in the upper portion 208 (e.g., head space) of the reservoir 119. The reservoir 119 may also include internal structures or filters (not shown for clarity). A liquid pump (e.g., centrifugal pump 123) may be used to pump the electrolyte from upper liquid portion 125 of the reservoir 119 via conduit 132 which has an inlet in portion 125 of the reservoir. Conduit 127 has an inlet in the lower liquid portion 126 of the reservoir 119 where the majority of the concentrated halogen reactant is located. In charge mode, conduit 127 is closed by valve 202 such no concentrated halogen reactant flows into the stack 103 via conduit 127 during charge mode. In discharge mode, valve 202 is open to allow halogen reactant to flow into the stack 103 via conduit 127.

Each flow battery cell 101 in the stack 103 includes a porous (e.g., fluid permeable) electrode 23 and a non-porous (e.g., fluid impermeable) electrode 25. As described above, the permeable electrode 23 may be made of any suitable material, such as a titanium sponge or mesh. The impermeable electrode 25 may be made of any suitable material, such as titanium. A layer of metal 25A, such as zinc, is plated on the impermeable electrode 25 (e.g., on the bottom surface of electrode 25), as shown in FIGS. 2B and 2C. The reaction zone 32 is located between and separates the impermeable electrode 25/layer of metal 25A and the permeable electrode 23.

FIG. 2B illustrates the flows through the stack 103 of FIG. 2A during charge mode. In the charge mode, aqueous halogen electrolyte is pumped by the pump 123 from the upper liquid portion 125 of the reservoir 119 through conduit 132 into conduit 115. Conduit 115 contains a first flow valve, such as a proportional three way valve 204. Valve 204 may be a computer controlled valve. The valve sends a majority (e.g., 51-100%, such as 60-95%, including 70-90%) of the electrolyte into conduit 115A, and a minority (e.g., 0-49%, such as 5-40%, including 10-30%) of the electrolyte (including no electrolyte) into conduit 115B. Conduit 115A is fluidly connected to the first stack inlet manifold 1 and conduit 115B is fluidly connected to the second stack inlet manifold 2, as will be described in more detail below.

The first stack inlet manifold 1 provides the major portion of the electrolyte to the reaction zone 32 of each cell 101, while the second stack inlet manifold 2 provides a minority of the electrolyte (or no electrolyte) to the space (e.g., one or more flow channels) 19 between the cells 101 located between the permeable electrode 23 of a first cell 101 and an impermeable electrode 25 of an adjacent second cell 101 located below the first cell in the stack 103. The electrodes 23, 25 of adjacent cells may be connected to each other to form a bipolar electrode assembly 50 as will be described in more detail below. Metal, such as zinc, plates on the bottom of the impermeable electrode 25 forming a metal layer 25A in the reaction zone 32. Halogen ions (such as chloride or bromide) in the aqueous electrolyte oxidize to form a diatomic halogen molecule (such as $Cl_2$, $Br_2$) on the permeable electrode 23.

The majority of the electrolyte flows through the reaction zone 32 and exits into first stack outlet manifold 3. The minority of the electrolyte (or no electrolyte) flowing in the flow channel(s) 19 between the cells 101 exits into the second stack outlet manifold 4.

Manifold 3 provides the electrolyte into conduit 120A while manifold 4 provides the electrolyte into conduit 120B. Conduits 120A and 120B converge at a second flow valve, such as a proportional three way valve 205. Valve 205 may be a computer controlled valve. Valve 205 is connected to the outlet conduit 120 and controls the electrolyte flow volume into conduit 120 from conduits 120A and 120B. Conduit 120 provides the electrolyte back into the upper liquid portion 25 of the reservoir 119.

Thus, in the charge mode, the metal halide electrolyte is pumped by pump 123 from the reservoir 119 through an inlet conduit (e.g., one or more of flow pathways 132, 115, 115A, 1) to the reaction zone 32 of each flow cell 101 in the stack 103 in one direction (e.g., left to right in FIG. 2B). A majority of the metal halide electrolyte enters the reaction zone 32 from the inlet conduit (e.g., from manifold 1 portion of the inlet conduit) without first flowing through the permeable electrode 23 in the flow cell 101 or through the flow channel 19 located between adjacent flow cell electrodes 23, 25 in the stack 103. The metal halide electrolyte then flows from the reaction zone 32 of each flow cell in the stack through an outlet conduit (e.g., one or more of flow pathways 3, 120A, 120) to the reservoir 119, such that the majority of the metal halide electrolyte does not pass through the permeable electrode 23 in each flow cell 101 before reaching the outlet conduit (e.g., manifold 3 portion of the outlet conduit).

FIG. 2C illustrates the flows through the stack 103 of FIG. 2A during discharge mode. In discharge mode, valve 202 in conduit 127 is opened, such that the aqueous electrolyte and concentrated halogen reactant (e.g., complexed bromine) are pumped by pump 123 from the respective middle portion 125 and the lower liquid portion 126 of the reservoir 119 to respective conduits 132 and 127.

The electrolyte and the concentrated halogen reactant are provided from respective regions 125 and 126 of the reservoir 119 via conduits 132 and 127. The mixture flows from conduit 115 via valve 204 and conduit 115A and optionally conduit 115B to respective inlet manifolds 1 and 2. As in the charge mode, the majority of the electrolyte and concentrated halogen reactant mixture flows into the inlet manifold 1 and a minority of the mixture (or no mixture) flows into the inlet manifold 2.

The electrolyte and concentrated halogen reactant (e.g., complexed bromine) mixture enters the reaction zone 32 from manifold 1. In other words, the mixture enters the cell reaction zone 32 between the electrodes 23, 25 from the manifold without first passing through the permeable electrode 23. Since the complexed bromine part of the mixture is heavier than the electrolyte, the complexed bromine flows through the permeable electrode 23 at the bottom of each cell 101. In the discharge mode, complexed bromine passing through the permeable electrode 23 is reduced by electrons, resulting in the formation of bromine ions. At the same time, the metal layer 25A on the impermeable electrode 25 is oxidized, resulting in metal (e.g., zinc) ions going into solution in the electrolyte. Bromine ions formed in the discharge step are provided into the flow channel(s) 19 between the cells 101, and are then provided from the flow channel(s) 19 through the second stack outlet manifold 4 into conduit 120B. The electrolyte rich in zinc ions is provided from the reaction zone 32 through the first stack outlet manifold 3 into conduit 120A. The bromine ions in conduit 120B and the zinc rich electrolyte in conduit 120A are mixed in valve 205 and then provided via conduit 120 back to the middle portion 125 of the reservoir.

Thus, in the discharge mode, the mixture of the metal halide electrolyte and the concentrated halogen reactant (e.g., complexed bromine) flows from the reservoir 119 through the inlet conduit (e.g., one or more of flow pathways 132, 115, 115A, 1) to the reaction zone 32 of each flow cell 101 in the stack 103 in the same direction as in the charge mode (e.g., left to right in FIG. 2C). A majority of the mixture enters the reaction zone 32 from the inlet conduit without first flowing through the permeable electrode 23 in the flow cells 101 or through the flow channel 19 located between adjacent flow cell 101 electrodes 23, 25 in the stack 103. The mixture then flows from the reaction zone 32 of each flow cell 101 in the stack 103 through the outlet conduit (e.g., one or more of flow pathways 3, 120A, 120) to the reservoir 119, such that a majority of the mixture passes through the permeable electrode 23 in each flow cell 101 before reaching the outlet conduit (e.g., the manifold 3 portion of the outlet conduit).

Thus, in charge mode, the majority of the flow is "flow-by" (e.g., the majority of the liquid flows by the permeable electrode through the reaction zone), while in discharge mode, the majority of the flow is "flow-through" (e.g., the majority of the liquid flows through the permeable electrode from the reaction zone) due to the difference in the reaction kinetics in charge and discharge modes.

In an example of a zinc-bromide flow battery, during charge mode, an electron is accepted in a reduction process (e.g., $Zn^{2+}+2e^-\rightarrow Zn$) at the negative (e.g., non-porous) electrode of each cell, while electrons are given away in an oxidation process (e.g., $Br^-\rightarrow Br_2+2e^-$) at the positive (e.g., porous) electrode. The process is reversed during the discharge mode. In this example, the electrolyte may be aqueous zinc bromide while the concentrated halogen may be liquid bromine, a bromine complex (e.g., a bromine-MEP complex) or a mixture thereof with the aqueous zinc bromide.

Valves 204 and/or 205 may be used control the ratio of liquid flow rate between the two inlet paths (e.g., 115A/115B) and/or between the two outlet paths (e.g., 120A/120B). Thus, the net amount of liquid that flows through the permeable electrode 23 may be controlled in charge and/or discharge mode. For example, in charge mode, the valve 205 may be adjusted to provide a higher liquid flow rate through manifold 3 and conduit 120A and a lower liquid flow rate through manifold 4 and conduit 120B to favor the "flow-by" flow configuration. In contrast, in discharge mode, the valve 205 may be adjusted to provide a lower liquid flow rate through manifold 3 and conduit 120A and a higher liquid flow rate through manifold 4 and conduit 120B compared to the charge mode to favor the "flow-through" flow configuration.

In charge mode, the majority of the flow is "flow-by" because this is preferable for the metal plating reaction and sufficient for the halogen oxidation reaction. For the metal plating reaction, it is important to maintain an adequate concentration of metal ions (e.g. $Zn^{2+}$) near the surface of the impermeable electrode 25 onto which the metal layer 25A will be plated. Insufficient flow speed at the exit end of the plating area (which might occur in the "flow-through" arrangement used during discharge) could lead to metal ion starvation and poor plating morphology, particularly at high stack open current when the bulk concentration of metal ions is at its lowest. The halogen oxidation reaction that takes place on the permeable electrode 23 (e.g. bromide ions oxidized to bromine) in the charge mode can be adequately supplied with reactants in either a "flow-by" or a "flow-through" arrangement.

In contrast, in the discharge mode, the majority of the flow is "flow-through" because this is sufficient for the metal layer 25A de-plating reaction and preferable for the halogen reduction reaction. The reactant in the metal de-plating reaction (i.e., zinc layer 25A) is already available along the entire surface of the impermeable electrode 25, where it was plated during the charge mode. As a result, both "flow-by" and "flow-through" are adequate to support this reaction. For the halogen reduction reaction (e.g. bromine reducing to bromide ions), it is important to supply an adequate concentration of halogen to the active surface of the permeable electrode 23. The molecular halogen is not as mobile as its ionic counterpart, particular if a complexing agent is used, so much more surface area and reactant flow rate is needed to support the halogen reduction reaction than the halogen oxidation reaction. Flowing through the permeable electrode 23 achieves this reactant supply requirement.

Thus, charge and discharge inlet flows no longer need to flow on opposite sides of the cell frame and/or in opposite directions. Rather, the same first stack inlet manifold 1 and the same pump 123 may be used to supply the majority of the flow to the reaction zone 32 during both charge and discharge modes. Thus, the majority of the liquid in both the charge and discharge mode flows in the same direction through the reaction zone in both modes and the majority of the liquid in both the charge and discharge mode enters the reaction zone 32 directly from the inlet manifold 1 without first flowing through the permeable electrode 23 or the flow channel(s) 19 between the cells 101. Thus, manifold 1 may be referred to as the "main inlet manifold."

If desirable, the second stack inlet manifold 2 may be used to supply a minority of the flow through the flow channel(s) 19 between the opposite electrodes 23, 25 of adjacent flow cells 101 to the bottom side of the permeable electrode 23 (i.e., the side of electrode 23 facing the flow channel(s) 19) during charge and/or discharge modes. These charge mode electrolyte purge flow and/or discharge mode electrolyte— complexed bromine mixture purge flow may be useful to prevent bubbles or denser complex phase liquid from accumulating beneath the permeable electrode 23 in the flow channel(s). Thus, the second stack inlet manifold may be referred to as the "secondary inlet manifold" or the "purge inlet manifold". The purge flows flow from the channel(s) 19 to the second stack outlet manifold 4. Alternatively, the second stack inlet manifold 2 and conduit 115B may be omitted to simplify the overall system design.

The flow battery system of FIG. 2A may also include an optional recombinator 200 and a gas pump 214. The recombinator is a chamber containing a catalyst which promotes or catalyzes recombination of hydrogen and halogen, such as bromine. The gas pump 214 provides halogen and hydrogen gas from the upper portion 208 of the reservoir 119 via conduit 220 to the recombinator 200. The hydrogen and halogen gases react with each other in the recombinator 200 to form a hydrogen-halogen compound. The hydrogen-halogen compound is then returned to the middle portion (e.g., upper liquid portion) 125 of the reservoir 119 from the recombinator 200 via conduits 222 and 120 by the action of the pump 214.

In another embodiment, the pump 214 is replaced with a venturi injector 216, as shown in FIG. 2A. Thus, the system preferably contains either the pump 214 or the venturi 216, but in some embodiments the system may contain both of them. Thus, the venturi is shown with dashed lines. The hydrogen-halogen compound is drawn from the recombinator 200 into conduit 222 which merges into the venturi injector. The hydrogen-halogen compound mixes with the electrolyte flow being returned from the stack 103 to the reservoir 119 in the venturi injector 206 and the mixture is returned to the reservoir 119 via the return conduit 120.

Figure 3A:
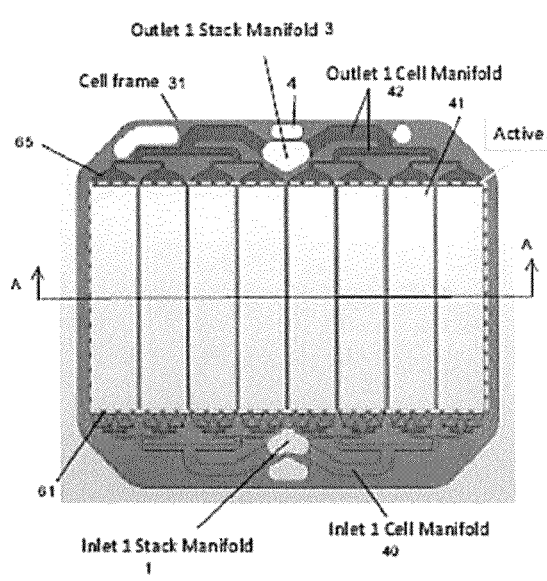
FIG. 3A is a plan view of an upper side of a cell frame for holding the horizontally positioned cells illustrated in FIGS. 2A-2C.
Figure 3B:
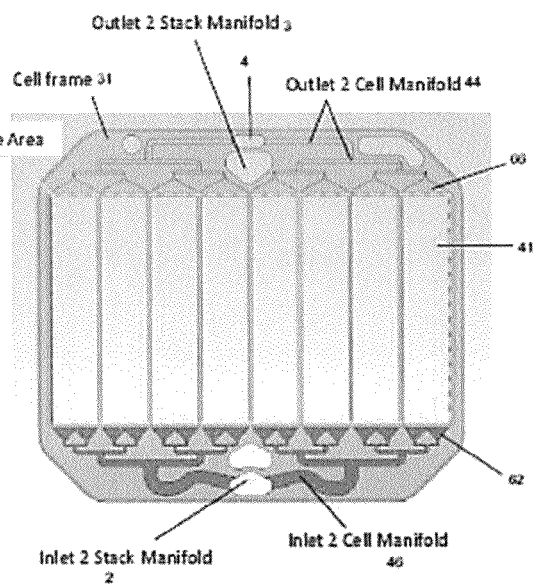
FIG. 3B is a plan view of a lower side of the cell frame illustrated in FIG. 3A.

FIGS. 3A and 3B illustrate the features of the top and bottom surfaces, respectively, of a cell frame 31 for holding the horizontally positioned flow battery cells illustrated in FIGS. 1 and 2A-2C. The frame 31 includes the main inlet manifold 1, the secondary inlet manifold 2 and the outlet manifolds 3, 4 described above. The manifolds 1-4 are respective openings through the frame 31 which align with similar openings in other stacked frames 31 to form the manifolds. Thus, the inlet manifolds 1, 2 are formed by aligned inlet manifold openings in the stack of cell frames while the outlet manifolds are formed by aligned outlet manifold openings in the stack of cell frames. The frames also include at least one inlet distribution (e.g., flow) channel and at least one outlet distribution channel. For example, as shown in FIGS. 3A and 3B, the upper and lower surfaces of the frame 31 each contain one inlet distribution channel (e.g., 40 on the upper side and 46 on the lower side) and one outlet distribution channel (e.g., 42 on the upper side and 44 on the lower side). These channels 40-46 comprise grooves in the respective surface of the frame 31. The distribution (e.g., flow) channels 40, 42, 44, 46 are connected to the active area 41 (e.g., opening in middle of frame 31 containing the electrodes 23, 25) and to a respective stack inlet or outlet manifold 1, 3, 4 and 2. The inlet distribution channels 40, 46 are configured to introduce the electrolyte from the respective stack inlet manifold 1, 2 to the reaction zone 32 or the flow channel(s) 19, and the outlet distribution channels 42, 44 are configured to introduce the electrolyte from the reaction zone 32 or the flow channel(s) to the respective outlet manifold 3, 4. Since the distribution/flow channels 40-46 deliver the electrolyte to and from each cell, they may also be referred to as the cell manifolds.

The electrolyte flows from the main inlet manifold 1 through inlet flow channels 40 and inlet 61 in the frame 31 to the flow cells 101. As illustrated in FIG. 3A, only the main inlet manifold 1 is fluidly connected to the inlet channels 40 on the top of the frame 31. In the embodiment illustrated in FIG. 3A, the charge mode inlet manifold 1 connects to two flow channels 40 which successively divide into subchannels (i.e., flow splitting nodes where each channel is split into two subchannels two or more times) to provide a more even and laminar electrolyte flow to the electrodes 23, 25. After passing across the electrodes 23, 25, the electrolyte exits the cells from outlet 65 into exit flow channels 42 on an opposite end or side of the frame 31 from the main inlet manifold 1. The electrolyte empties from the exit (i.e., outlet) flow channels 42 to a first stack outlet manifold 3. Exit channels 42 may also comprise flow splitting nodes/subchannels as shown in FIG. 3A.

As illustrated in FIG. 3B, on the bottom side of the cell frame 31, the second inlet manifold 2 is connected to bottom purge inlet channels 46 while the main manifold 1 is fluidly isolated from the purge inlet channels 46. While the secondary inlet manifold 2 is shown as being located closer to the edge of the frame 31 than the main manifold 1 in FIGS. 3A and 3B, the positions of the manifolds 1 and 2 may be reversed. Thus, manifold 1 may be located closer to the frame 31 edge than manifold 2, as shown in FIG. 2A or the manifolds 1, 2 may be located side by side, as shown in FIG. 4. The second stack outlet manifold 4 is connected to the electrochemical cells via outlet 66 and bottom exit channels 44 on the bottom surface of the frame 31.

FIGS. 3C and 3D illustrate the flows through the manifolds in the stack of cell frames 31. The stack of cell frames 31 supports the stack 103 of cells 101. The stack of cell frames 31 is preferably a vertical stack in which adjacent cell frames are separated in the vertical direction.

As shown in FIG. 3C, the majority of the liquid flow in the charge and discharge mode flows upward through the main inlet manifold 1 in the frames 31. The flow exits the manifold 1 in each frame to two flow channels 40 which successively divide into subchannels (i.e., flow splitting nodes where each channel is split into two subchannels two or more times). The flow then flows from subchannels 40 through outlet 61 into the reaction zone 32 of each cell. After passing through the reaction zone between the electrodes 23, 25 of each cell 101, the flow exits the cells from outlet 65 into exit flow channels 42 on an opposite end or side of the frame 31 from the main inlet manifold 1. The flow empties from the exit flow channels 42 to the first stack outlet manifold 3. As described above, in discharge mode, a portion of the flow passes through the permeable electrode 23 into the flow channel(s) 19. After passing through the flow channel(s) 19, the flow is provided through outlet 66 into exit flow channels 44. The flow empties from the exit flow channels 44 to the second stack outlet manifold 4.

As shown in FIG. 3D, the minority of the liquid flow (e.g., the purge flow) flows in the charge and discharge mode flows upward through the secondary inlet manifold 2 in the frames 31. The flow exits the manifold 2 in each frame to two flow channels 46 which successively divide into subchannels (i.e., flow splitting nodes where each channel is split into two subchannels two or more times). The flow then flows from subchannels 46 through outlet 62 into the flow channel(s) 19 between each cell 101. After passing through the flow channel(s) 19, the flow is provided through outlet 66 into exit flow channels 44. The flow empties from the exit flow channels 44 to the second stack outlet manifold 4.

As described above with respect to FIGS. 2B and 2C, in charge mode, the purge flow passes through outlets 66 channels 44 to manifold 4. In discharge mode, the majority of the flow passes through the permeable electrode 23 into channel(s) 19 and then through outlet 66 into exit channels 44 and then into manifold 4. Thus, the purge flow may be omitted in discharge mode by adjusting valve 204 to close line 115B.

Figure 3E:
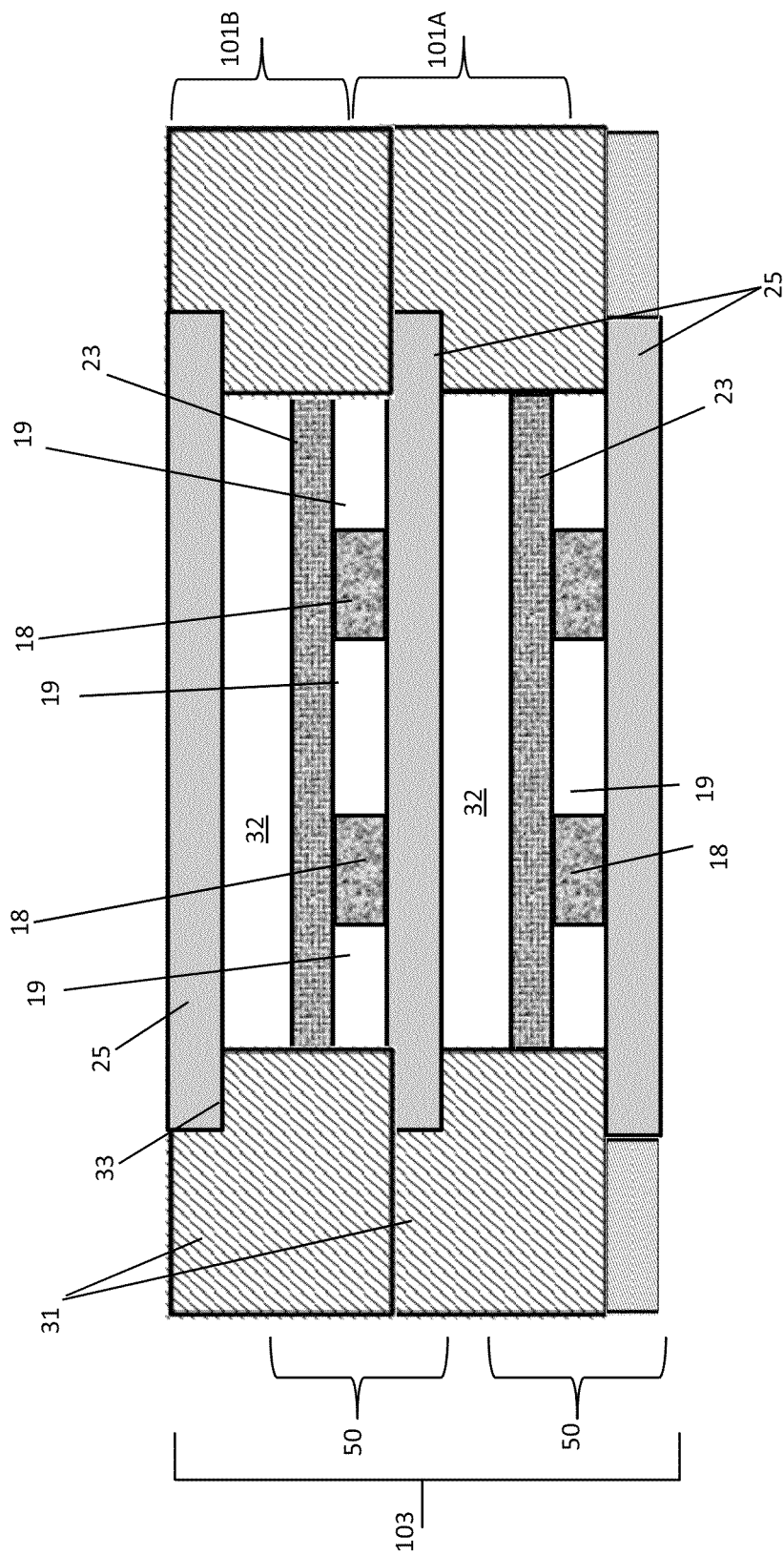
FIG. 3E schematically illustrates side cross sectional view of an embodiment of a stack of electrochemical cells in a stack of frames through the line A'-A' in FIG. 3A

FIG. 3E illustrates a cross section of an embodiment of a stack of electrochemical cells in a stack of frames through the line A'-A' in FIG. 3A. The cross section A'-A' is transverse to the flow of electrolyte in the electrochemical cell from inlet manifolds 1, 2 to outlet manifolds 3, 4. In this embodiment, the frame 31 includes ledges 33 on which the non-permeable (negative) metal electrode 25 is seated. Additionally, the non-permeable electrode 25 of a first electrochemical cell 101a is spaced apart from and connected to the permeable (positive) electrode 23 of an adjacent, overlying electrochemical cell 101b by one or more electrically conductive spacers 18, such as metal or carbon spacers. An electrolyte flow channel 19 is thereby formed between the non-permeable electrode 25 of the first electrochemical cell 101a and the overlying permeable electrode 23 of an adjacent electrochemical cell 101b. Further, if plural conductive spacers 18 are used, then the spacers divide the electrolyte flow path 18 into a series of flow channels 19.

In an embodiment, the electrodes 23, 25 of adjacent electrochemical cells 101 are provided as an assembly 50. In this embodiment, the non-permeable electrode 25 of a first electrochemical cell 101a, the conductive spacers 18 separated by channels 19 and the porous electrode 23 of the adjacent electrochemical cell 101b are assembled as a single unit. The individual components may be glued, bolted, clamped, brazed, soldered or otherwise joined together. The fabrication of an electrode assembly 50 simplifies and speeds the assembly of stacked flow cell device. Each electrode assembly is placed into a respective frame 31, such that one electrode (e.g., the larger non-permeable electrode 25) is supported by the ledges 33 in the frame 31, and the other electrode (e.g., the smaller non-permeable electrode 23) is supported in the space 41 between the ledges 33 by the spacers 18 from the underlying non-permeable electrode 25. Of course the order of the electrodes may be reversed and the porous electrode may be supported by the ledges 33. Other electrode attachment configurations, such as bolting or clamping to the frame, may be used. The frames 31 with the electrodes 23, 25 are stacked upon each other to form the stack 103 of cells. As each frame is stacked, a new cell 101 is created with a reaction zone 32 in between the bottom electrode 23 and a top electrode 25 of each cell. As seen in FIGS. 2A-2C, the electrodes 23, 25 of the same cell (e.g., 101a) are separated by the reaction zone 32 and do not physically or electrically contact each other and comprise a portion of separate electrode assemblies.

As described above, the flow battery system illustrated in FIGS. 1-3E contains two types of flow manifolds: stack manifolds 1, 2, 3 and 4 which are common flow paths that feed individual cell flow paths, and cell manifolds 40, 42, 44 and 46 which are flow paths that distribute flow from (or to) the stack manifold to (or from) the entire width of the active area in an individual flow cell. Preferably, as described above and illustrated in FIGS. 3A and 3B, the stack manifolds (e.g., aligned holes in a stack of cell frames 31) and cell manifolds (e.g., grooves in the cell frames 31) are formed directly into the cell frames 31 that house and align the electrodes in a stack assembly. This eliminates the cost and complexity associated with external manifold plumbing (e.g., large tube feeding multiple small tubes) found in prior art flow batteries. Additionally, the integration of the stack and cell manifolds into the cell frame ensures that the stack and cell manifolds are fully contained within the primary stack sealing envelope shown in FIG. 12. As a result, the flow channel seals are not integral to the seal between the stack and the vessel 102, reducing the overall leak risk.

Figure 4A:
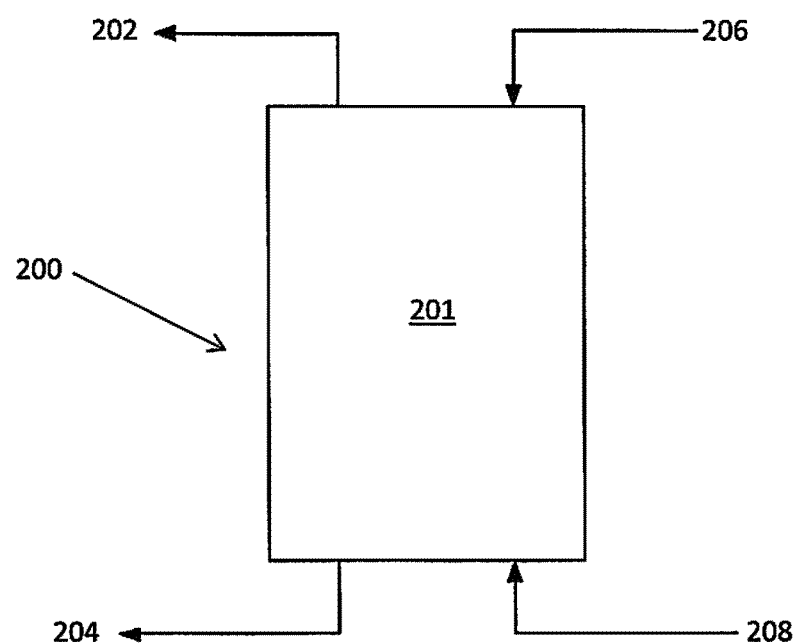
FIG. 4A is a schematic illustration of a reservoir and balance of plant portion of a flow battery system according to an embodiment.

The flow battery system also includes and electrolyte reservoir 200 illustrated in FIG. 4A. An embodiment of the electrolyte reservoir 200 includes a vessel 201 (e.g., tank or other suitable fluid container) with two outlets (also referred to as stack feed lines) 202, 204 and two inlets (also referred to as reservoir return lines from the stack) 206, 208. The outlets 102, 104 and inlets 106, 108 may each be an opening and/or a conduit (e.g., pipe or manifold line) leading from the reservoir 200 to stack 100 and from the stack 100 back to reservoir, respectively. There are separate aqueous electrolyte and concentrated halogen suction feed lines 202, 204 to allow access to regions within the reservoir of varying fluidic composition (e.g., upper lighter electrolyte and lower heavier concentrated halogen regions). There are separate aqueous electrolyte and concentrated halogen return lines 206, 208 to allow for separate return streams to be provided to different portions within the reservoir.

Figure 4B:
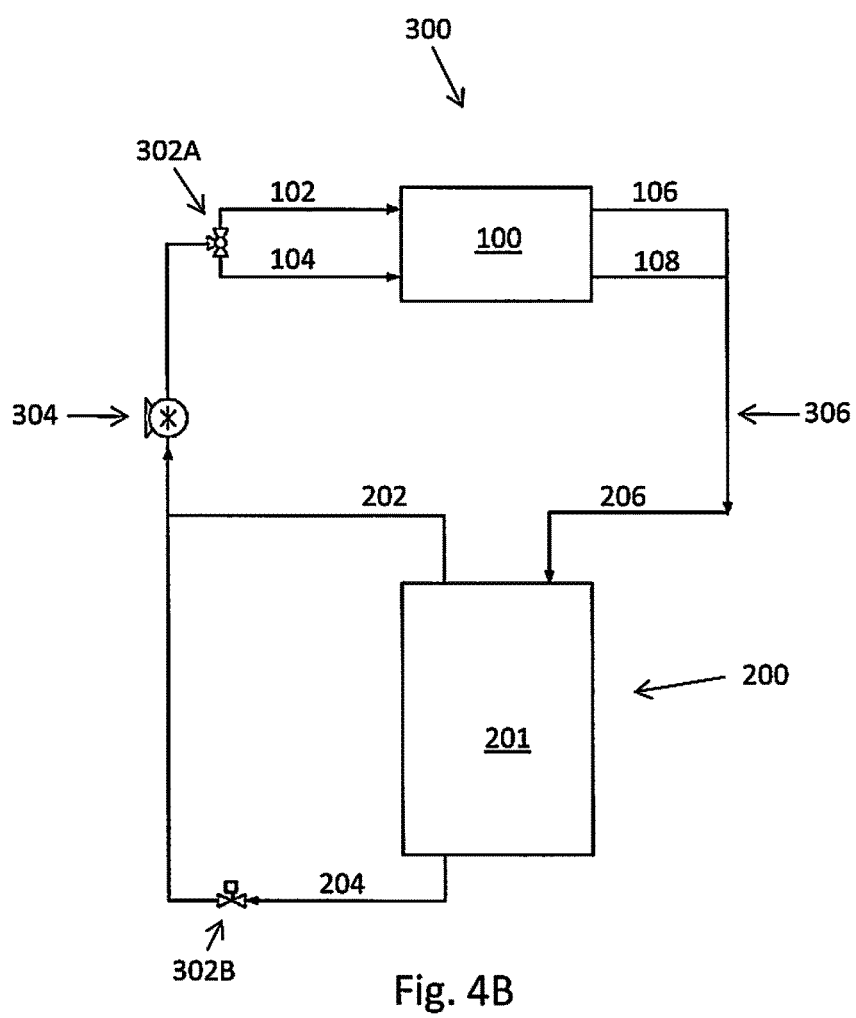
FIG. 4B is schematic illustration of a balance of plant plumbing configuration of the flow battery system according to an embodiment.

An embodiment of a metal-halogen flow battery system 300 illustrating an embodiment of a balance of plant (BOP) plumbing configuration is shown in FIG. 4B. In charge mode, aqueous electrolyte is pumped from reservoir 200 by pump 304 through line 202. An actuated valve 302A can distribute the electrolyte flow to the charge inlet 102 and/or discharge inlet 104 of the cell stack 100 in charge mode. Preferably, the majority or all of the electrolyte is provided to the stack through inlet 102 through valve 302A. In charge mode, valve 302B in line 204 is closed so that the concentrated halogen is not provided from the reservoir 200 into stack 100 through line 204. The common and bypass exits 106, 108 of the cell stack 100 are joined to a common return line 306 which is connected to the aqueous electrolyte return 206 of the reservoir 200. Preferably, the exits 106, 108 are joined to the common return line 306 outside the stack 100. For example, exits 106, 108 may be conduits which separately extend outside the stack enclosure or frame before merging into a common conduit 306. The concentrated halogen return line 208 of the reservoir 200 is omitted in this embodiment. Thus, all electrolyte flows from the stack through line 306 to the reservoir.

In discharge mode, the actuated valve 302B on the concentrated halogen feed line (i.e., suction pathway) 204 is opened which allows the main system pump 304 to provide simultaneous suction of aqueous electrolyte from the upper part of the vessel 201 via line 202a and of the concentrated halogen reactant from the lower part of the vessel 201 via line 204. This high halogen-content fluid is provided to the cell stack 100 through valve 302A and inlet 104. The electrolyte outlet flow from the stack 100 into the reservoir 200 in discharge mode is the same as in the charge mode in this embodiment.

Figure 4C:
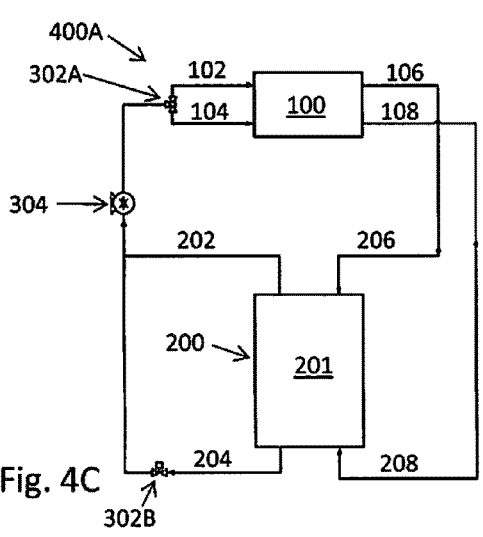
FIG. 4C is a schematic illustration of a balance of plant plumbing configuration of a system according to an embodiment in which the bypass exit of the cell stack is ported directly to the concentrated halogen return of the electrolyte reservoir.

FIGS. 4C-4G illustrate embodiments of metal-halogen flow battery systems 400A-400E with different BOP configuration features that may be used singly or in any combination to reduce the concentrated halogen content of circulating electrolyte. FIG. 4C shows a BOP in which the bypass exit 108 of the cell stack 100 is ported directly to the concentrated halogen return line 208 of the electrolyte reservoir 200, while the common exit 106 is connected to the aqueous electrolyte return 206.

Figure 4D:
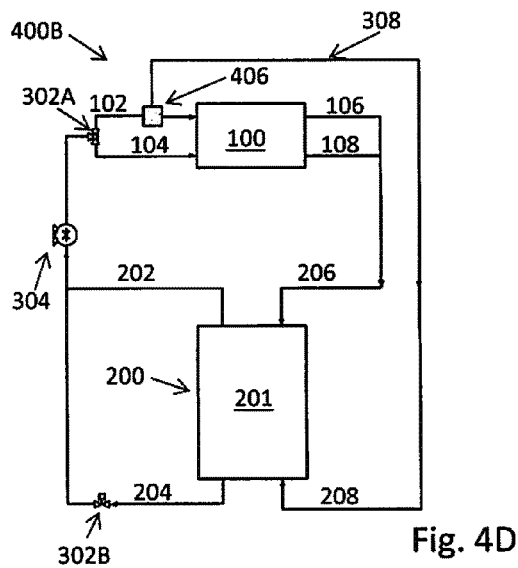
FIG. 4D is a schematic illustration of a balance of plant plumbing configuration of a system according to an embodiment in which where a fine filter is placed on the battery cell stack charge inlet.

FIG. 4D shows a configuration where a fine filter 406, such as a hydrocyclone, coalescer, or other device that separates suspensions based on physiochemical differences, is placed on the battery cell stack charge mode inlet 102. The filter 406 reduces the concentrated halogen content of the electrolyte entering the charge mode inlet 102 and provides a concentrated halogen stream that bypasses the battery cell stack 100 via a bypass channel 308 and is ported directly to the concentrated halogen return 208 of the reservoir 200.

Figure 4E:
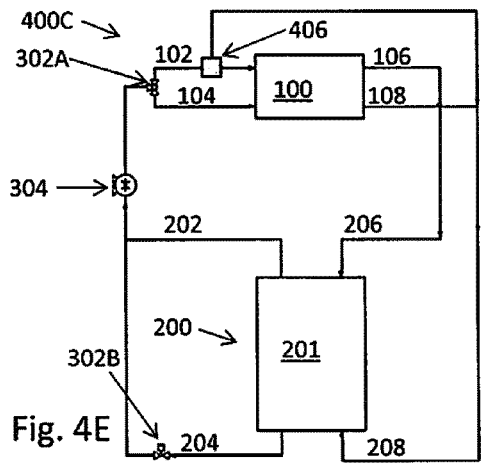
FIG. 4E is a schematic illustration of a balance of plant plumbing configuration of a system according to an embodiment in which the bypass exit and the output of a charge inlet fine filter are both ported to the concentrated halogen return of the reservoir.

FIG. 4E illustrates an embodiment that includes a combination of the features of the embodiments illustrated in FIGS. 4C and 4D. In this embodiment, the bypass exit 108 and the output of a charge inlet fine filter 406 are both ported to the concentrated halogen return 208 of the reservoir 200.

Figure 4F:
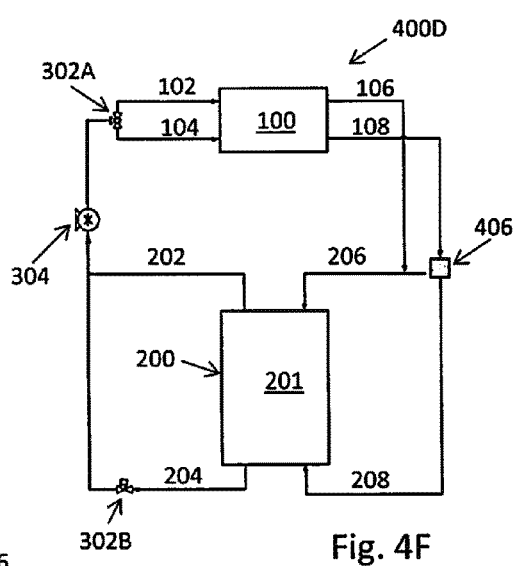
FIG. 4F is a schematic illustration of a balance of plant plumbing configuration of a system according to an embodiment in which a fine filter is placed on the bypass exit.

FIG. 4F illustrates an embodiment in which a fine filter 406 is placed on the bypass exit 108. The filter 406 provides a concentrated halogen stream that can be ported to the concentrated halogen return 208 of the reservoir 200 and an aqueous electrolyte stream that may be ported to the aqueous electrolyte return 206 of the reservoir 200.

Figure 4G:
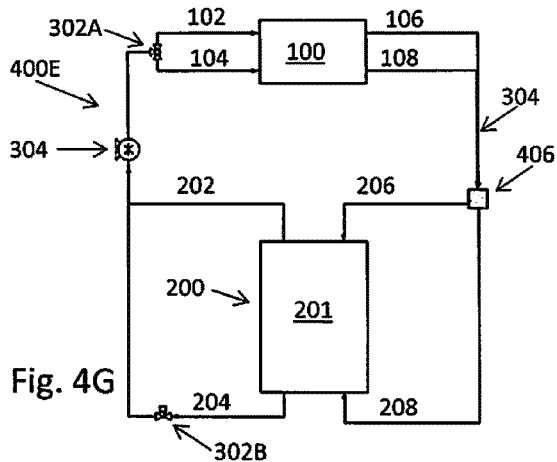
FIG. 4G is a schematic illustration of a balance of plant plumbing configuration of a system according to an embodiment in which a fine filter is placed on the joined common and bypass exits of the flow battery cell stack.

FIG. 4G illustrates an embodiment in which a fine filter 406 is placed on the joined common and bypass exits 306 of the cell stack 100 of FIG. 4B. The filter 406 provides a concentrated halogen stream that can be ported to the concentrated halogen return 208 of the reservoir 200 and an aqueous electrolyte stream that may be ported to the aqueous electrolyte return 206 of the reservoir 200.

Figure 5A:
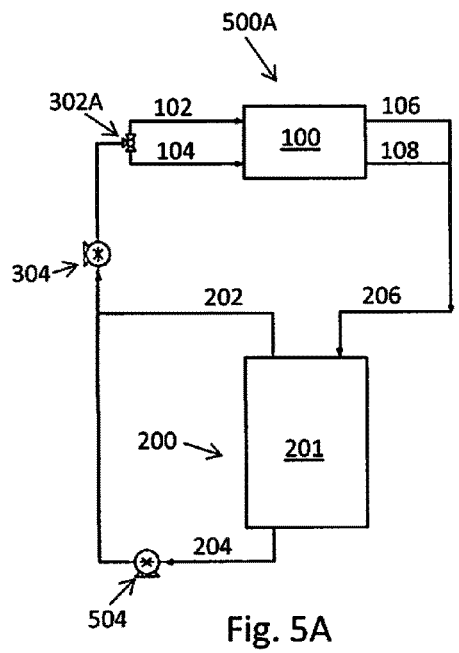
FIG. 5A is a schematic illustration of a balance of plant plumbing configuration of a system according to an embodiment in which an additional pump is added to introduce concentrated halogen to the cell stack instead of direct suction by the main system pump.

FIGS. 5A-5F illustrate embodiments of metal-halogen flow battery system 500A-500F with different BOP configuration features that allow for the introduction and remixing of concentrated halogen reactant with the aqueous electrolyte during battery discharge mode. As illustrated, these embodiments are based on FIG. 4B, but they can be used in concert with any of the BOP configurations features shown in FIGS. 4C-4G. FIG. 5A provides a metal-halogen flow battery system 500A similar to FIG. 3, but uses a second pump 504 to introduce concentrated halogen to stack 100 in discharge mode instead of direct suction by the main system pump 304. Pump 504 is located on the concentrated halogen feed line 204. Thus, in this embodiment, valve 302B may be omitted because the pump 504 performs the valving function by turning on in discharge mode and off in charge mode.

Figure 5B:
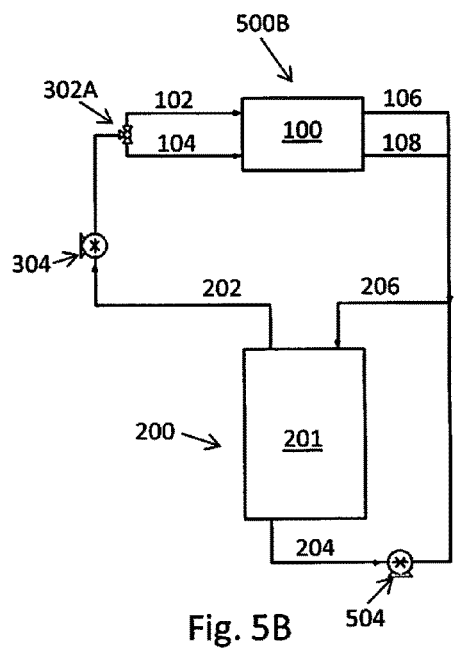
FIG. 5B is a schematic illustration of a balance of plant plumbing configuration of a system according to an embodiment in which concentrated halogen is pumped to the aqueous electrolyte return, creating a mixture of concentrated halogen reactant and aqueous electrolyte within the reservoir.

In the metal-halogen flow battery system 500B illustrated in FIG. 5B, the pump 504 is also located on line 204. However, in this embodiment, line 204 connects to the common return line 306 instead of to the main pump 304 and valve 302A. The concentrated halogen is pumped to the aqueous electrolyte return 206, creating a mixture of concentrated halogen reactant and aqueous electrolyte within the reservoir 200. This halogen-enriched fluid may be used in discharge mode when the main pump 304 suctions the fluid from the upper part of the vessel 201 into line 202.

Figure 5C:
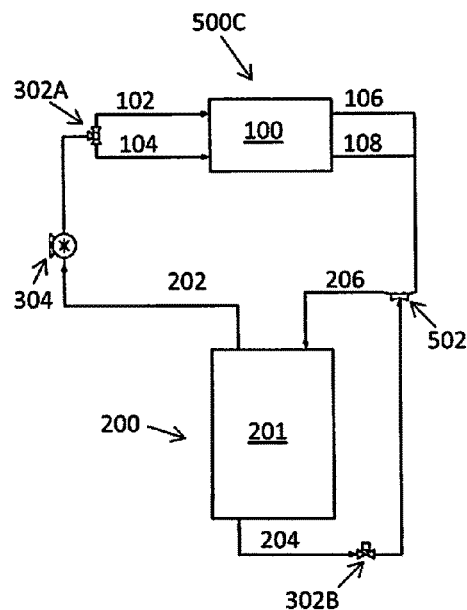
FIG. 5C is a schematic illustration of a balance of plant plumbing configuration of a system according to an embodiment in which a Venturi injector is used to move fluid from the concentrated halogen suction to the aqueous electrolyte return.

The metal-halogen flow battery system 500C illustrated in FIG. 5C is similar to the metal-halogen flow battery system 500B illustrated in FIG. 5B, but it uses a Venturi injector 502 to move fluid from the concentrated halogen suction outlet 204 to the aqueous electrolyte return 206. An actuated valve 302B may be placed on the concentrated halogen suction outlet 204 to allow concentrated halogen flow only during discharge mode but not in charge.

Figure 5D:
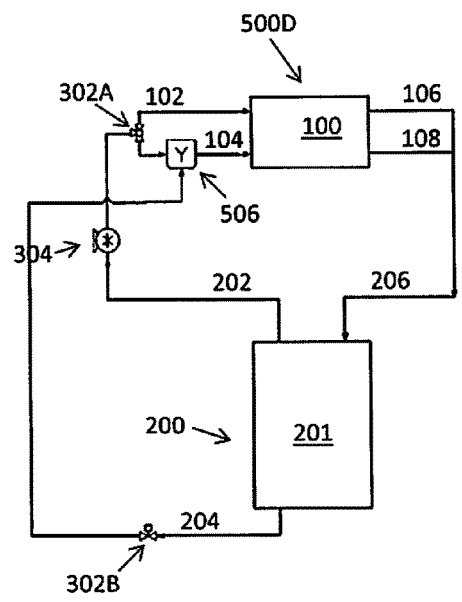
FIG. 5D is a schematic illustration of a balance of plant plumbing configuration of a system according to an embodiment in which the concentrated halogen injection point is moved to the discharge inlet.

The metal-halogen flow battery system 500D illustrated in FIG. 5D moves the concentrated halogen injection point to the discharge mode inlet 104. The concentrated halogen may be either pumped or suctioned using a Venturi injector in discharge mode through the open actuated valve 302B. A physical mixing device 506, such as a nozzle, static mixer, ultrasonic emulsifier, etc., may be located between the concentrated halogen injection point and the battery cell stack 100 to disperse the injected fluid into the bulk electrolyte flow in inlet 104.

FIG. 5E shows an embodiment of a metal-halogen flow battery system 500E with a mixing device 506, such as a nozzle, static mixer, ultrasonic emulsifier, etc., placed on the joined exit 306 of the battery cell stack. This mixer helps to homogenize the suspension of electrolyte and concentrated halogen reactant leaving the battery cell stack 100 via exits 106, 108, creating a better discharge fluid in the reservoir 200.

FIG. 5F illustrates an embodiment of a metal-halogen flow battery system 500F with an inline heater element 508 on the concentrated halogen feed line 204. Heating the concentrated halogen flow stream alters the physical and chemical properties of the concentrated halogen flow stream and may facilitate mixing. Heating the concentrated halogen flow stream may also make more halogen available for the discharge reaction in the battery cell stack 100. An inline heater 508 could also be added to any of the embodiments illustrated in FIGS. 5A-5E.

FIGS. 6A-6D schematically illustrate alternative flow paths for a flow of the metal-halide electrolyte and the halogen reactant through the horizontally positioned cells of a stack, such as the stack 103 of FIGS. 1 and 2A. The electrolyte flow paths in FIGS. 6A-6D are represented by arrows. For brevity, and in order to allow comparison with the electrolyte flow paths previously discussed, components illustrated in and discussed above with respect to FIGS. 2A-2C, are identified in FIGS. 6A-6D with the same reference numerals.

Figure 6A:
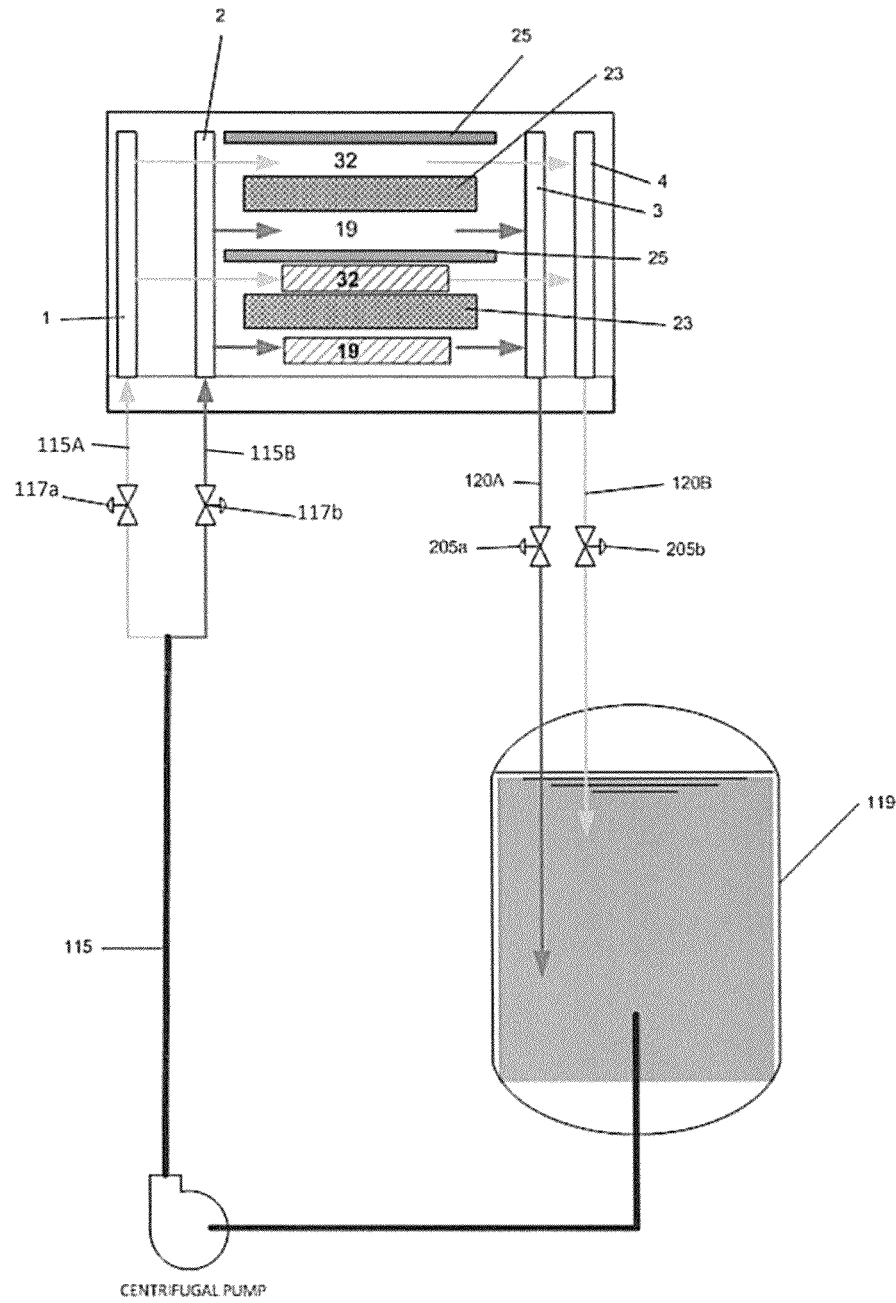
FIG. 6A illustrates a schematic side cross sectional view of flow paths in an alternative embodiment electrochemical system.

In an alternative embodiment shown in FIG. 6A, manifold 3 provides the electrolyte into conduit 120A while manifold 4 provides the electrolyte into conduit 120B. Conduits 120A and 120B separately provide outlet (i.e., exit) flow streams to the reservoir 119, and have separate flow control valves 205a and 205b, respectively (instead of the three way valve 205 in FIG. 2A). In this manner, the tendency of the complex halogen to settle out and collect in the discharge exit path in conduit 120A may be avoided. That is, preserving the concentrated stream of complex halogen and returning it to a separate location may enable easier storage and management of the complex phase. Also, to control the flow ratios of the main inlet line and purge inlet line, conduits 115A and 115B may be configured with control flow valves 117a and 117b, respectively. If the majority of the flow enters the main inlet conduit 115A in all operational modes, then flow control valve 117a may be eliminated.

Figure 6B:
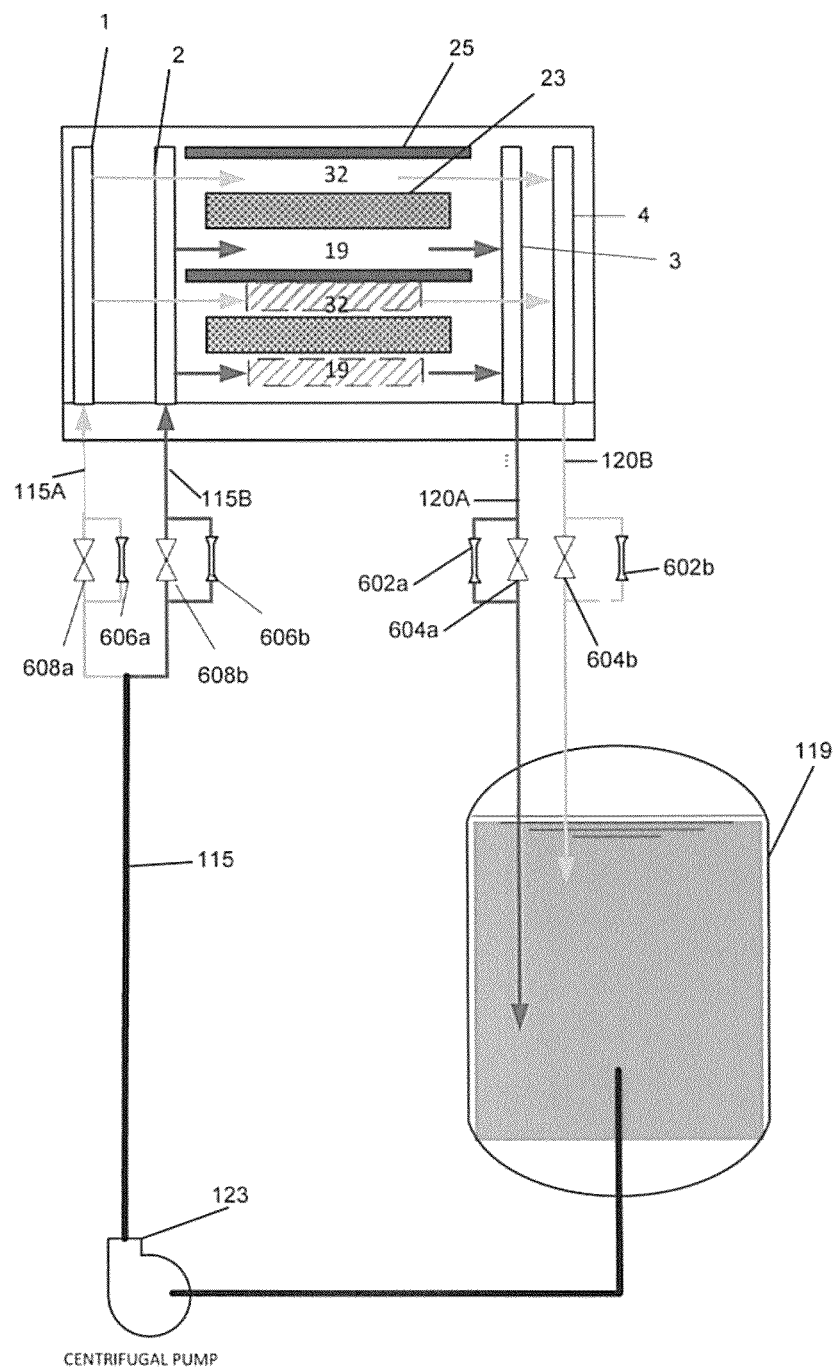
FIG. 6B illustrates a schematic side cross sectional view of flow paths in an alternative embodiment electrochemical system.

In another alternative embodiment, shown in FIG. 6B, conduits 120A and 120B separately provide exit flow streams to the reservoir 119, similar to the embodiment discussed above with respect to FIG. 6A. In this embodiment, however, conduits 120A and 120B may be configured with calibrated pipe restrictions 602a, 602b and on/off valves 604a, 604b, in order to control the flow ratios of the exit flow streams. Also, to control the flow ratios of the main inlet line and purge inlet line, conduits 115A and 115B may be configured with calibrated pipe restrictions 606a, 606b and on/off valves 608a, 608b. The pipe restrictions comprise a narrow pipe or orifice that has a smaller width or diameter than conduits 120A, 120B. If the majority of the flow enters the main inlet conduit 115A in all operational modes, then flow control valves 117a, 117b and restriction 606a may be eliminated to leave only the restriction 606b.

Figure 6C:
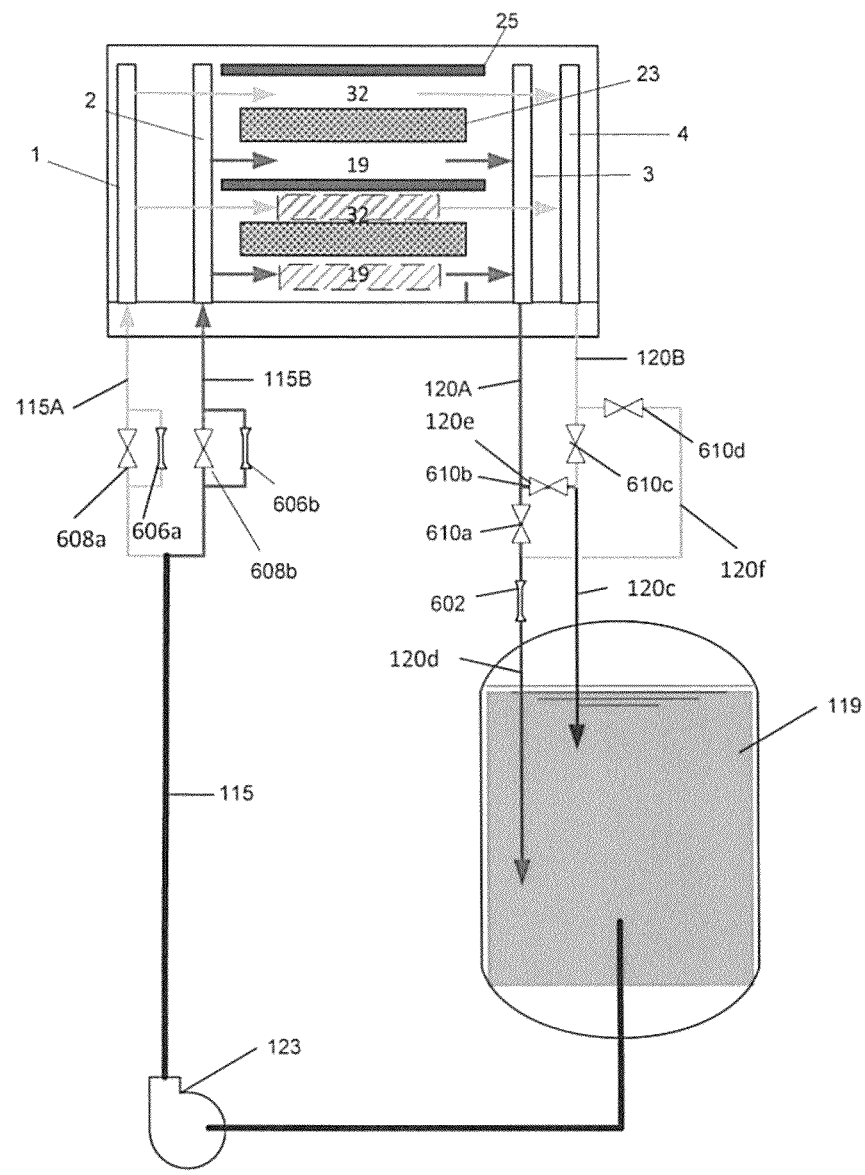
FIG. 6C illustrates a schematic side cross sectional view of flow paths in an alternative embodiment electrochemical system.

In another alternative embodiment, shown in FIG. 6C, the output conduits 120A, 120B may be fluidly connected to a majority outlet flow conduit 120c and a minority outlet flow conduit 120d. The majority of the outlet (i.e., exit) flow always flows through conduit 120c in both charge and discharge modes, while the minority of the outlet flow flows through conduit 120d in both charge and discharge modes. A calibrated pipe restriction 602 is located in conduit 120d but not in conduit 120c. On/off valves 610a, 610b, 610c and 610d may be used to steer the outlet (i.e., exit) flows from manifolds 3 and 4 through various conduits 120a-120d into the reservoir 119.

In this configuration, the exit flow return locations are differentiated by flow rate, rather than the flow path from which they originated. For example, in charge mode, the majority of the outlet flow flows from reaction zone 32, through manifold 4, into conduit 120B, while the minority of the outlet flow or no outlet flow flows from region 19 through manifold 3 into conduit 120A. In charge mode, on/off valves 610a and 610c are open and valves 610b and 610d are closed. This valve configuration forces the minority of the outlet flow to travel from region 19 through manifold 3, conduit 120A, valve 610a and through the calibrated pipe restriction 602 in conduit 120d to the reservoir, while the majority of the outlet flow travels from reaction zone 32 through manifold 4, conduit 120B, valve 610c and conduit 120c into the reservoir.

In the discharge mode, the valve configuration is reversed, on/off valves 610a and 610c are closed and valves 610b and 610d are open. This valve configuration forces the minority of the outlet flow to travel from the reaction zone 32 through manifold 4, conduit 120B, valve 610d, bypass conduit 120f and through the calibrated pipe restriction 602 in conduit 120d to the reservoir, while the majority of the outlet flow travels from region 19 through manifold 3, conduit 120A, valve 610b, bypass conduit 120e and conduit 120c into the reservoir. Thus, in both modes, the majority of the flow bypasses the restriction 602 while the minority of the flow flows through the restriction.

While four on/off valves are illustrated in FIG. 6C, multiway valve(s) may be used instead to direct the flows between conduits 120A, 120B and conduits 102C and 120D. This arrangement of FIG. 6C may be preferable if there is a device downstream of the stack that operates best under specific flow conditions.

Figure 6D:
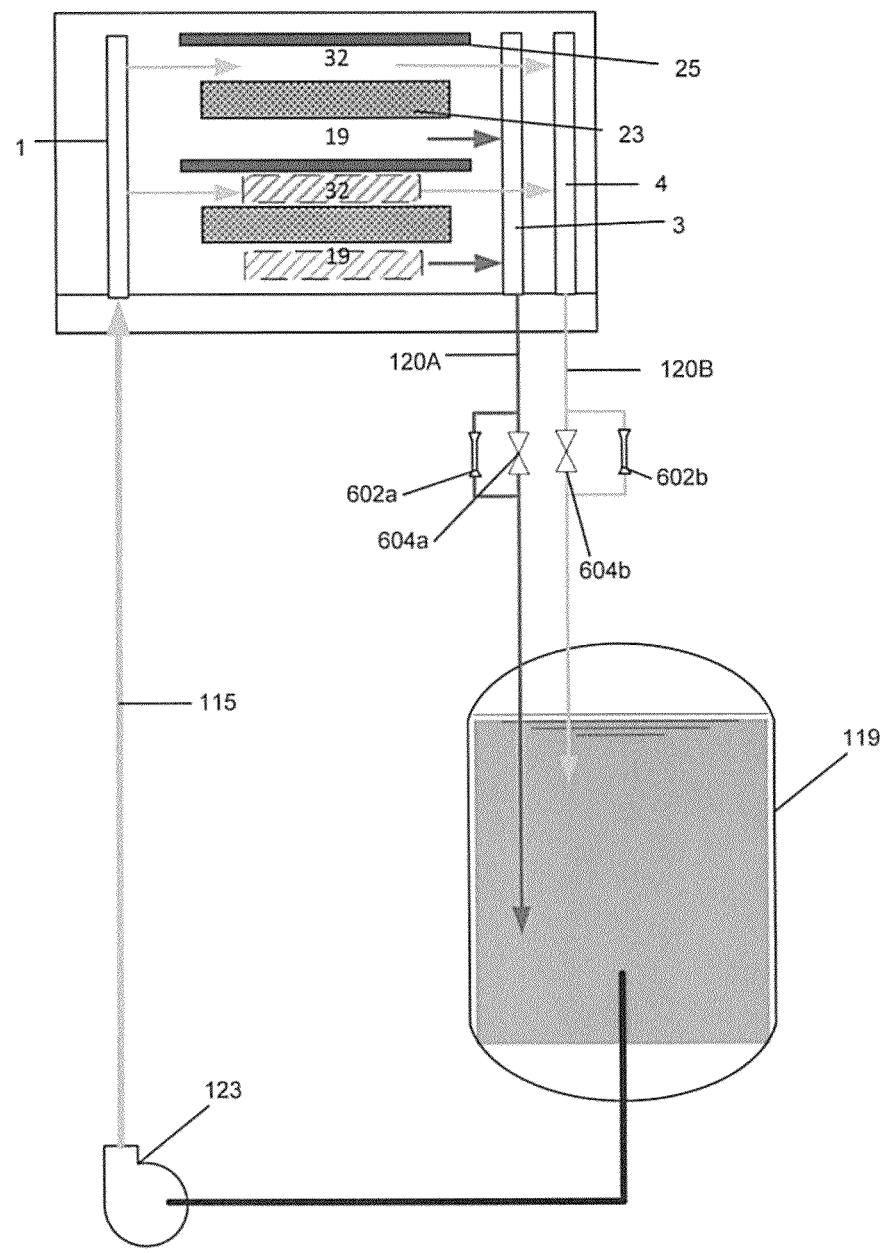
FIG. 6D illustrates a schematic side cross sectional view of flow paths in an alternative embodiment electrochemical system.
Figure 6E:
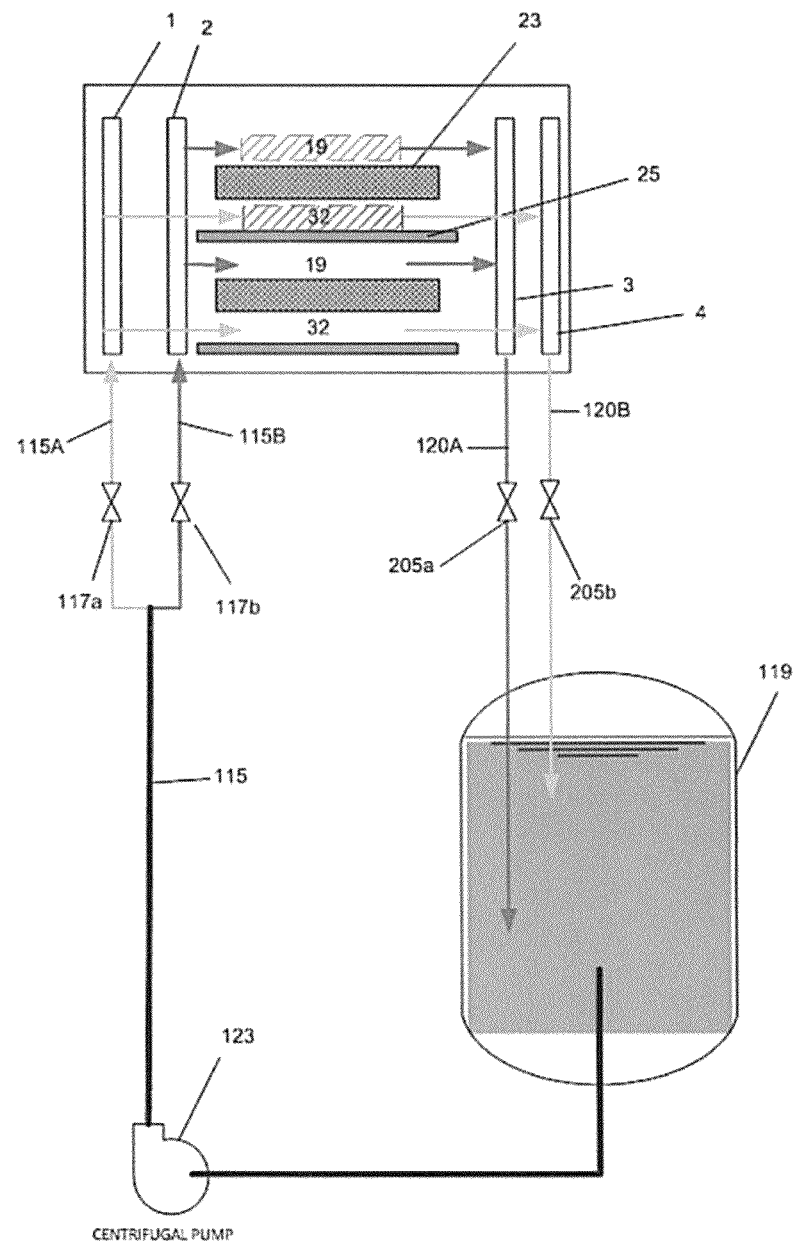
FIG. 6E illustrates a schematic side cross sectional view of flow paths in an alternative embodiment electrochemical system.
Figure 6F:
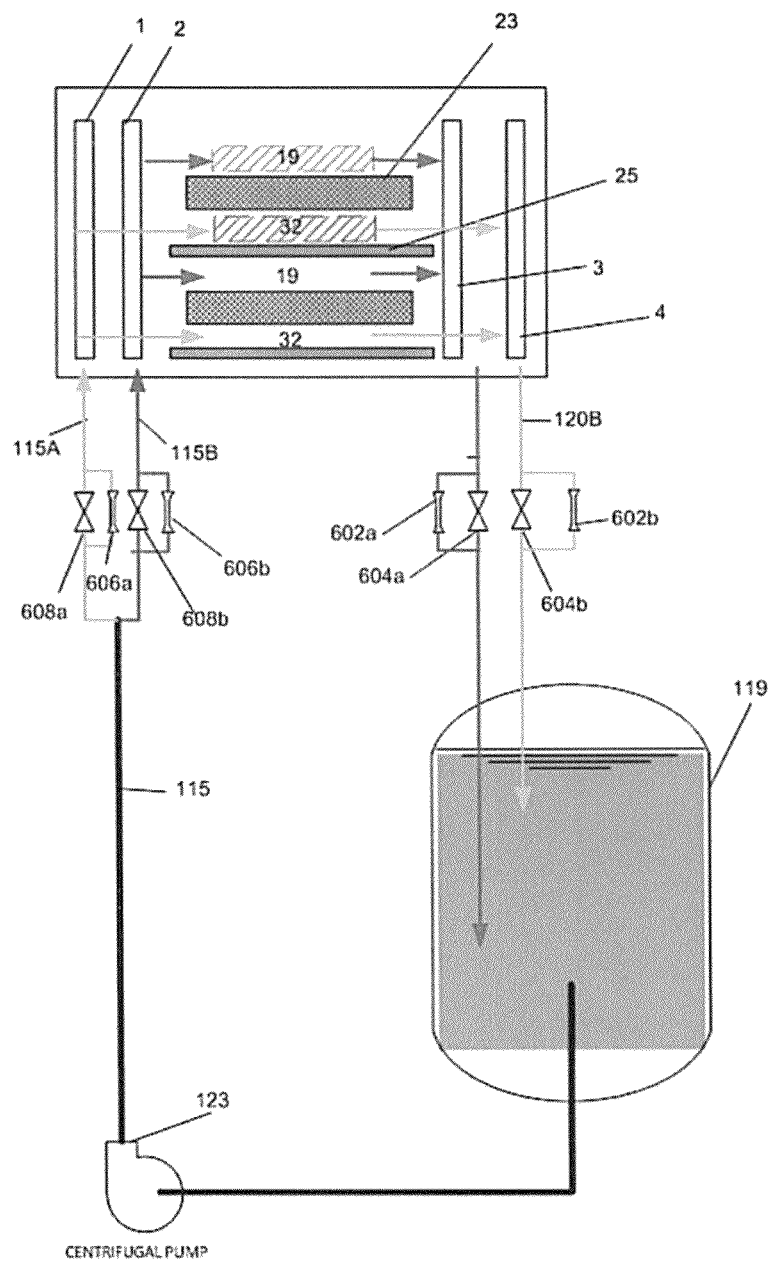
FIG. 6F illustrates a schematic side cross sectional view of flow paths in an alternative embodiment electrochemical system.
Figure 6G:
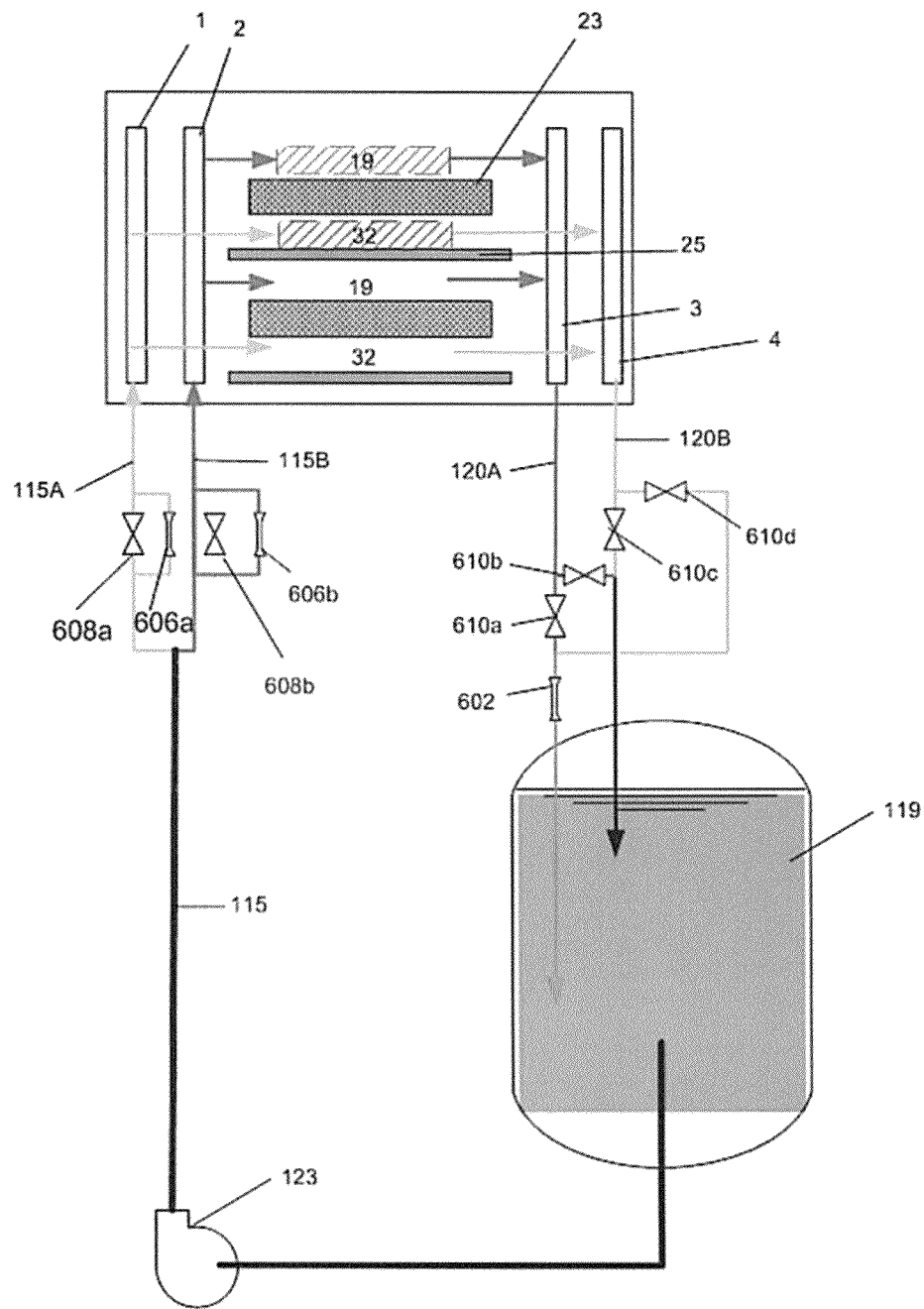
FIG. 6G illustrates a schematic side cross sectional view of flow paths in an alternative embodiment electrochemical system.

In another alternative embodiment, shown in FIG. 6D, the main inlet is provided by conduit 115, through which electrolyte may flow from the reservoir 119 to the manifold 1. In contrast to other embodiments discussed herein, no purge inlet or inlet flow control valve is provided in this embodiment configuration. Thus, conduit 115B and manifold 2 are omitted in this embodiment and there is only one common inlet conduit 115 and inlet manifold 1 for both charge and discharge modes. Conduits 120A and 120B may be configured with calibrated pipe restrictions 602a, 602b and on/off valves 604a, 604b, in order to control the flow ratios of the exit flow streams, similar to the embodiment described above with respect to FIG. 6B. Valve 604a is closed and valve 604b is open in charge mode. In contrast, valve 604a is open and valve 604b is closed in discharge mode. Thus, fixed restriction should be sufficient to control the amount of flow going into each outlet path, in which allows the use of pair of cheaper on/off valves rather than a more costly flow control valve.

FIGS. 6E-6H schematically illustrate alternative embodiments corresponding to the embodiments shown in FIGS. 6A-6D, respectively. In each of FIGS. 6E-6H, the upper electrode in each cell is a permeable electrode 23, and the lower electrode in each cell is an impermeable electrode 25, whereas FIGS. 6A-6D show the opposite electrode configuration. In contrast to the Zn plating in FIGS. 6A-6D, which occurs on the bottom face of impermeable electrode 25 against gravity, in FIGS. 6E-6H, the plating of Zn occurs on the top face of impermeable electrode 25. All other features in FIGS. 6E-6H are similar to FIGS. 6A-6D. Of course the alternative electrode configuration described above for FIGS. 6E-6H may also be used in the system shown in FIG. 6A.

Figure 6H:
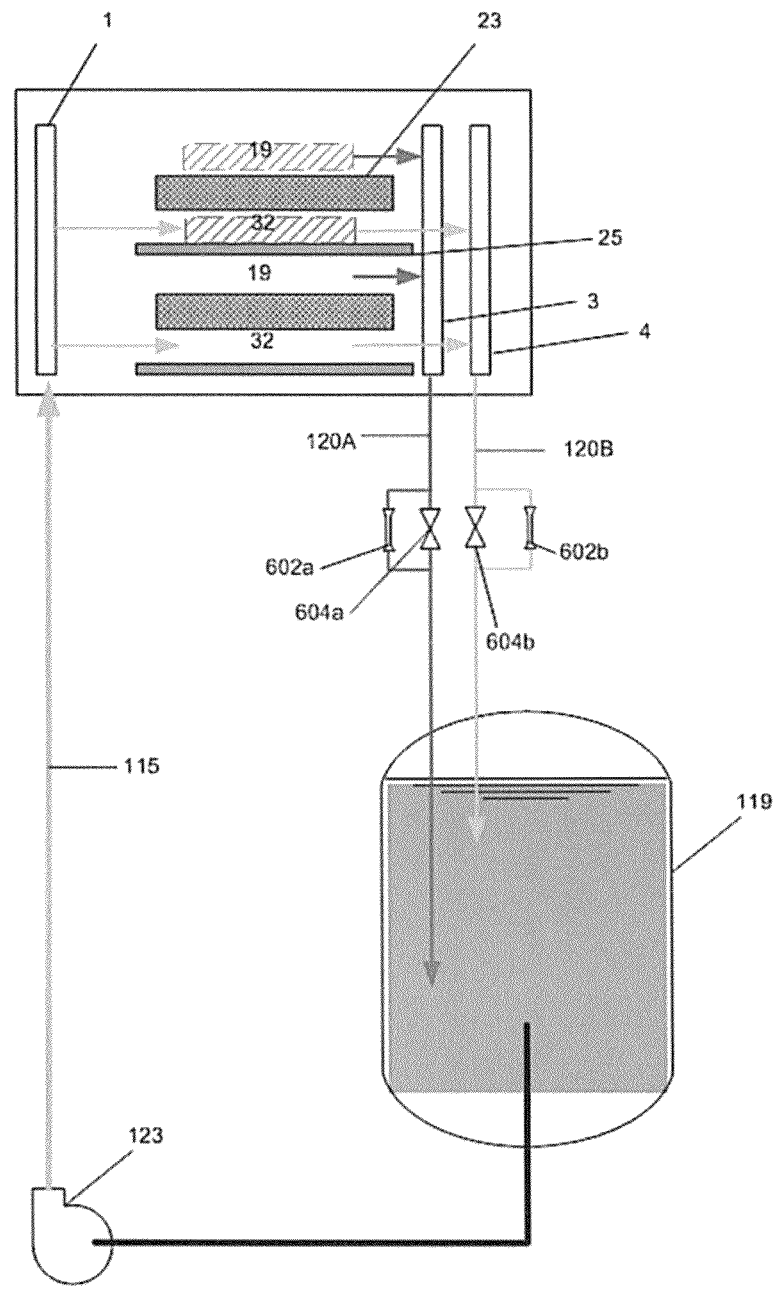
FIG. 6H illustrates a schematic side cross sectional view of flow paths in an alternative embodiment electrochemical system.
Figure 6I:
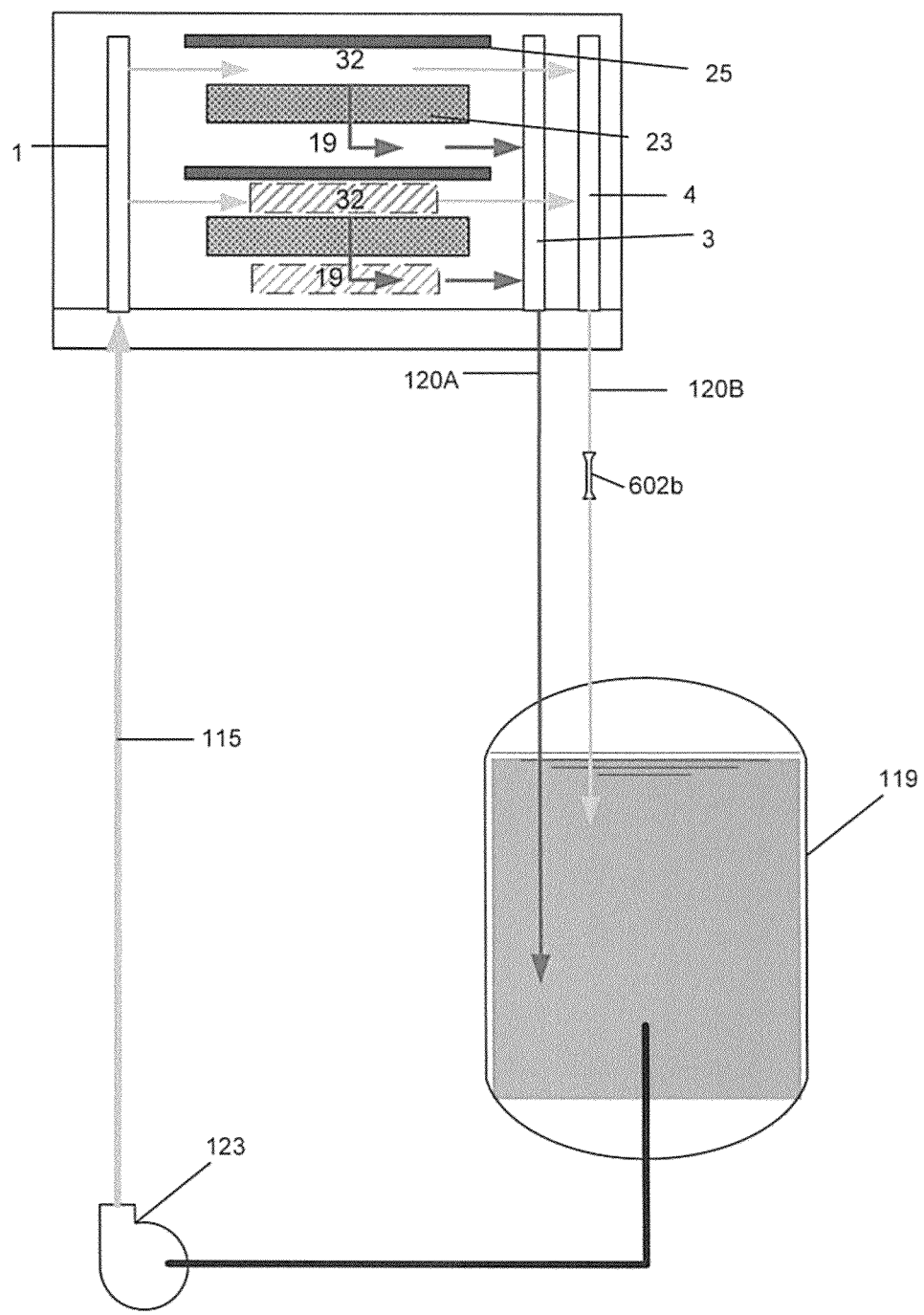
FIGS. 6I and 6J illustrate schematic side cross sectional views of flow paths in alternative embodiment electrochemical systems.

Referring back to the alternative flow paths for a flow of metal-halide electrolyte and the halogen reactant through the horizontally positioned cells of a stack, FIG. 6I schematically illustrates another alternative embodiment. Similar to FIG. 6D, the main inlet is provided by conduit 115, through which electrolyte may flow from the reservoir 119 to the manifold 1. Thus, in this embodiment of FIG. 6I there is one common inlet conduit 115 and inlet manifold 1 for both charge and discharge modes. In contrast to the embodiment illustrated in FIG. 6D, no outlet on/off valves are provided for conduits 120A and 120B in this embodiment. Conduit 120B may be configured with a calibrated pipe restriction 602b in order to control the flow ratio of the flow streams between conduits 120A and 120B. Preferably conduit 120A lacks the restriction. By placing the calibrated flow restriction 602b in conduit 120B, fluid dynamics may force a majority of fluid flow (e.g., 80%) from reaction zone 32 through the porous electrode 23 and region 19 to manifold 3 and conduit 120A in both the charge and discharge modes. At the same time, a minority of the fluid flow (e.g., 20%) may exit from reaction zone 32 through manifold 4 and conduit 120B without flowing through the porous electrode 23. The fixed restriction should be sufficient to control the amount of flow into each outlet path, thus allowing for a simpler and more reliable system by having fewer valves and having cell geometry optimized for one flow condition.

Figure 6J:
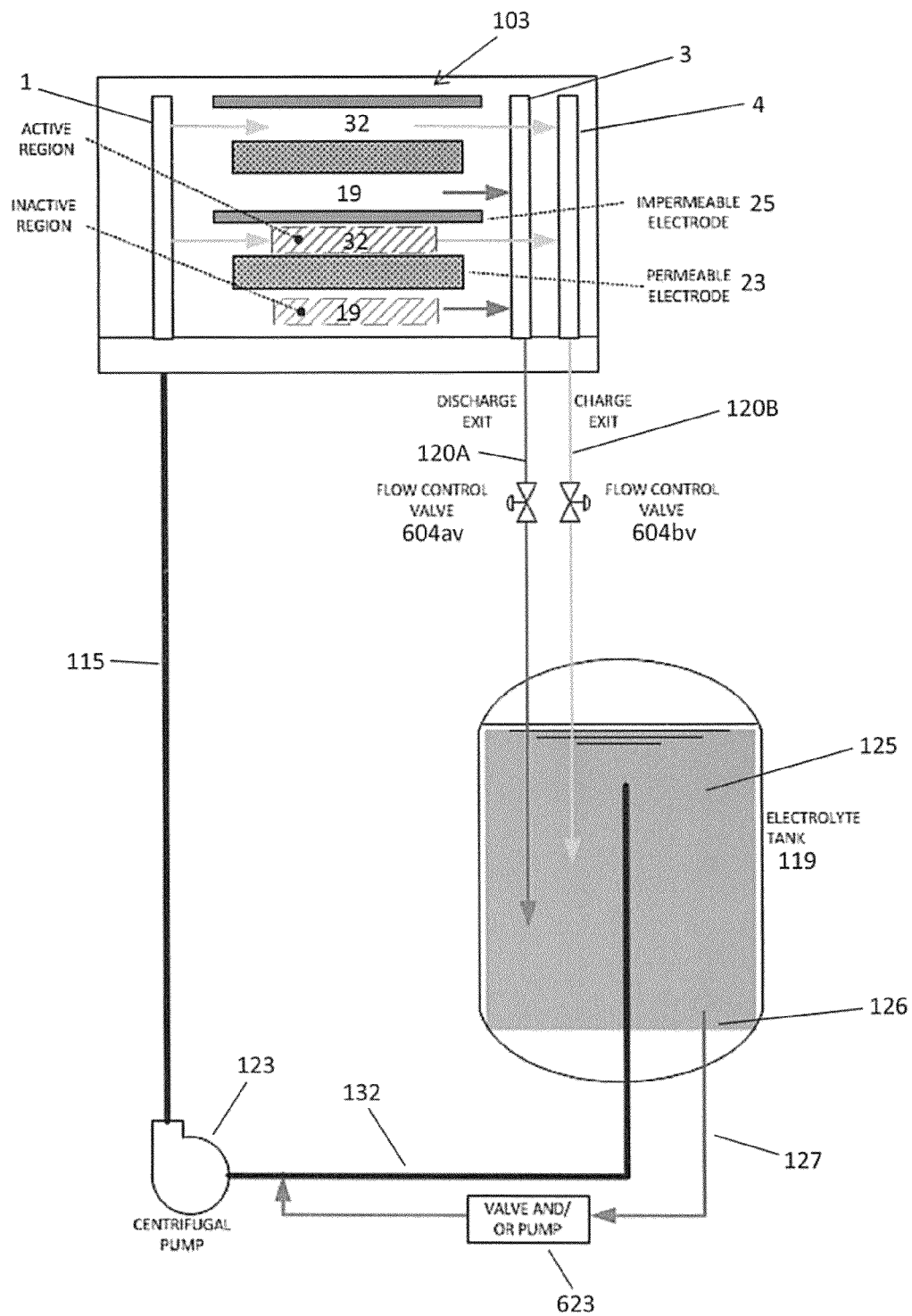

FIG. 6J schematically illustrates another alternative embodiment. Similar to the embodiment illustrated in FIG. 6I, the main inlet is provided by conduit 115 through which electrolyte may flow from the reservoir 119 to the manifold 1. However, in contrast to the embodiment illustrated in FIG. 6I and similar to the embodiment illustrated in FIG. 2A, the reservoir 119 contains two feed lines 127, 132. An inlet of the feed line 127 is located in the lower part 126 of the reservoir 119, where the complexed bromine reactant (i.e., the concentrated halogen reactant) may be stored. In contrast to the embodiment illustrated in FIG. 2A, an outlet of the feed line 127 is connected to an inlet of a second pump and/or valve 623. An inlet of the second electrolyte intake feed line (e.g. pipe or conduit 132) is located in the upper part 125 of the reservoir 119, where the lighter metal-halide electrolyte (e.g., aqueous zinc bromide) is located. In the embodiment illustrated in FIG. 6J, the pipe or conduit 132 exits through a bottom wall of the reservoir 119. However, the pipe or conduit 132 may be configured to exit through a side wall of the reservoir 119 as illustrated in FIG. 2A. Further, unlike the pipe or conduit 132 illustrated in FIG. 2A, the outlet of the pipe or conduit 132 of the present embodiment is not connected to a valve 202. Rather, the outlet of the feed line 132 is connected to an inlet of the pump 123. In charge mode, conduit 127 is closed by shutting off the valve and/or pump 623 (e.g., turning off the pump) such no concentrated halogen reactant flows into the stack 103 via conduit 127 during charge mode. In discharge mode, valve and/or pump 623 is open (e.g., the pump is turned on) to allow the concentrated halogen reactant to flow into the stack 103 via conduit 127. Preferably, conduit 127 is connected to conduit 132 upstream of the pump 123 such that the pump 123 can draw both the concentrated halogen reactant from conduit 127 and the metal-halide electrolyte from conduit 132 into conduit 115 to be provided into the stack 103.

Additionally, similar to the embodiments illustrated in FIGS. 6B, 6H and 6I, conduits 120A and 120B separately provide exit flow streams from the stack 103 to the reservoir 119. In this embodiment, however, conduits 120A and 120B may be configured with variable flow control valves 604av, 604bv, in order to control the flow ratios of the exit flow streams rather than calibrated pipe restrictions 602a, 602b and on/off valves 604a, 604b.

Thus, in this embodiment of FIG. 6J there is one common inlet conduit 115 and inlet manifold 1 for both charge and discharge modes, similar to that shown in FIG. 6I. The variable valves 604av and/or 604bv may be configured to force the majority of fluid flow (e.g., >50%, such as 60-90%, for example 80%) from reaction zone 32 through the porous electrode 23 and region 19 to manifold 3 and conduit 120A in both the charge and discharge modes, while forcing a minority of the fluid flow (e.g., <50%, such as 10-40%, for example 20%) to exit from reaction zone 32 through manifold 4 and conduit 120B without flowing through the porous electrode 23. Alternatively, the variable valves 604av and/or 604bv may be configured to force the minority of fluid flow (e.g. <50%, such as 10-40%, for example 20%) from reaction zone 32 through the porous electrode 23 and region 19 to manifold 3 and conduit 120A in both the charge and discharge modes, while forcing a majority of the fluid flow (e.g., >50%, such as 60-90%, for example 80%) to exit from reaction zone 32 through manifold 4 and conduit 120B without flowing through the porous electrode 23.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of operating a flow battery comprising a stack of flow cells where each flow cell in the stack comprises a fluid permeable electrode, a fluid impermeable electrode, and a reaction zone between the permeable and impermeable electrodes, the method comprising:
　(a) in charge mode, plating a metal layer on the impermeable electrode of each cell in the reaction zone by:
　　(i) flowing a metal halide electrolyte from a reservoir through an inlet conduit to the reaction zone of each flow cell in the stack in a first direction, such that a majority of the metal halide electrolyte enters the reaction zone from the inlet conduit without first flowing through the permeable electrode in the flow cell or through a flow channel located between adjacent flow cell electrodes in the stack; and
　　(ii) flowing the metal halide electrolyte from the reaction zone of each flow cell in the stack through a first outlet conduit to the reservoir, such that the majority of the metal halide electrolyte does not pass through the permeable electrode in each flow cell before reaching the first outlet conduit; and
　(b) in discharge mode, de-plating the metal layer on the impermeable electrode of each cell in the reaction zone by:
　　(i) flowing a mixture of the metal halide electrolyte and a concentrated halogen reactant from the reservoir through the inlet conduit to the reaction zone of each flow cell in the stack in the first direction, such that a majority of the mixture enters the reaction zone from the inlet conduit without first flowing through the permeable electrode in the flow cells or through the flow channel located between adjacent flow cell electrodes in the stack; and
　　(ii) flowing the mixture from the reaction zone of each flow cell in the stack through a second outlet conduit to the reservoir, such that a majority of the mixture passes through the permeable electrode in each flow cell before reaching the second outlet conduit.

2. The method of claim 1, wherein:
the stack of flow cells comprises a vertical stack of horizontally positioned flow cells;
the stack of flow cells is supported by a stack of cell frames;
a portion of the inlet conduit comprises a first inlet manifold;
a portion of the first outlet conduit comprises a first outlet manifold;
a portion of the second outlet conduit comprises a second outlet manifold;
each cell frame in the stack of cell frames comprises a first inlet manifold opening and a first and a second outlet manifold openings;
the first inlet manifold is formed by aligned first inlet manifold openings in the stack of cell frames; and
the first and the second outlet manifolds are formed by respective aligned first and second outlet manifold openings in the stack of cell frames.

3. The method of claim 1, wherein:
the metal halide electrolyte comprises zinc bromide;
the concentrated halogen reactant comprises complexed bromine;
the metal layer comprises zinc;
the permeable electrode comprises porous ruthenized titanium; and
the non-permeable electrode comprises titanium that is coated with the zinc metal layer during the charge mode.

4. The method of claim 1, further comprising:
in the charge mode, flowing a first purge stream comprising a minority of the metal halide electrolyte provided from the reservoir through a second inlet manifold in the stack of cell frames to the flow channel located between adjacent flow cell electrodes in the stack, and from the flow channel through the second outlet manifold in the stack of cell frames to the reservoir; and
in the discharge mode, flowing a second purge stream comprising a minority of the mixture provided from the reservoir through the second inlet manifold in the stack of cell frames to the flow channel located between adjacent flow cell electrodes in the stack, and from the flow channel through the second outlet manifold in the stack of cell frames to the reservoir.

5. The method of claim 4, further comprising controlling an amount of flow through each flow cell by adjusting at least one of a first valve located in the inlet conduit and a second valve located in the at least one of the first or second outlet conduits, such that in the charge mode the majority of the metal halide electrolyte does not pass through the permeable electrode in each flow cell before reaching the first outlet conduit, and in the discharge mode, the majority of the mixture passes through the permeable electrode in each flow cell before reaching the second outlet conduit.

6. The method of claim 5, wherein the step of controlling comprises adjusting the second valve to provide a higher liquid flow rate through the first outlet manifold than the second outlet manifold in the charge mode, and adjusting the second valve to provide a lower liquid flow rate through the first outlet manifold than the second outlet manifold in the discharge mode.

7. The method of claim 4, further comprising using a single pump in a single flow loop to pump the metal halide electrolyte from the reservoir to the inlet conduit in the charge mode, and to pump the metal halide electrolyte and the concentrated halogen reactant from the reservoir to the inlet conduit in the discharge mode.

8. The method of claim 4, further comprising combining outlet flow streams from the first outlet conduit and the second outlet conduit in both charge and discharge mode and providing a combined flow streams to the reservoir in both charge and discharge mode.

9. The method of claim 4, further comprising controlling a flow rate of outlet flow streams in the first and the second outlet conduits and providing separate outlet flow streams into the reservoir.

10. The method of claim 9, wherein the step of controlling comprises using flow control valves or a combination of a flow restrictor and an on/off valve.

11. The method of claim 4, further comprising:
in the charge mode, directing a minority of the electrolyte through the second outlet conduit and through a flow restrictor into the reservoir, and directing the majority of the electrolyte from the first outlet conduit into the reservoir without passing through the flow restrictor; and
in the discharge mode, directing a minority of the mixture through the first outlet conduit and through the flow restrictor into the reservoir, and directing the majority of the mixture from the second outlet conduit into the reservoir without passing through the flow restrictor.

12. The method of claim 4, further comprising:
providing only the metal halide electrolyte into the stack without providing the first purge stream into the stack in the charge mode;
providing only the mixture into the stack without providing the second purge stream into the stack in the discharge mode;
controlling a flow rate of outlet flow streams in the first and the second outlet conduits; and
providing separate outlet flow streams into the reservoir.

13. The method of claim 12, wherein the step of controlling comprises using a combination of a flow restrictor and an on/off valve.

14. The method of claim 1, wherein flowing a mixture of the metal halide electrolyte and a concentrated halogen reactant from the reservoir comprises flowing the metal halide electrolyte through a first feed line fluidly connected to the reservoir and flowing the concentrated halogen reactant through a second feed line fluidly connected to the reservoir.

15. The method of claim 14, wherein the first feed line comprises an intake fluidly connected to an upper portion of the reservoir and the second feed line comprises an intake fluidly connected to a lower portion of the reservoir.

16. The method of claim 14, further comprising mixing the metal halide electrolyte and the concentrated halogen reactant prior to providing the mixture to a first pump in a single flow loop.

17. The method of claim 16, further comprising pumping the concentrated halogen reactant with a second pump prior to mixing.

18. The method of claim 16, wherein in the charge mode no concentrated halogen reactant flows into the stack via the second feed line and in the discharge mode the concentrated halogen reactant flows into the stack via the second feed line.

19. The method of claim 1, further comprising controlling an amount of flow through each flow cell by adjusting at least one of a first variable valve located in the first outlet conduit and a second variable valve located in the second outlet conduit.

* * * * *